US012695557B2

(12) United States Patent
Abotabl et al.

(10) Patent No.: US 12,695,557 B2
(45) Date of Patent: Jul. 28, 2026

(54) FULL-DUPLEX OPERATIONS FOR USER EQUIPMENTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Dai Lu, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/447,779

(22) Filed: Aug. 10, 2023

(65) Prior Publication Data

US 2025/0055612 A1      Feb. 13, 2025

(51) Int. Cl.
| | |
|---|---|
| *H04L 5/00* | (2006.01) |
| *H04L 5/14* | (2006.01) |
| *H04L 27/26* | (2006.01) |

(52) U.S. Cl.
CPC ................ *H04L 5/001* (2013.01); *H04L 5/14* (2013.01); *H04L 27/2605* (2013.01)

(58) Field of Classification Search
None
See application file for complete search history.

(56) References Cited

U.S. PATENT DOCUMENTS

| | | |
|---|---|---|
| 2021/0135832 A1 | 5/2021 | Ly et al. |
| 2021/0152418 A1* | 5/2021 | Abdelghaffar ....... H04B 7/0602 |

(Continued)

FOREIGN PATENT DOCUMENTS

| | | |
|---|---|---|
| WO | WO-2015042336 A1 | 3/2015 |
| WO | WO-2022214389 A2 | 10/2022 |

(Continued)

OTHER PUBLICATIONS

Moderator (Catt): "Summary #1 of Subband Non-overlapping Full Duplex", 3GPP TSG RAN WG1 #110, R1-220xxxx, Toulouse, France, Aug. 22, 2022-Aug. 26, 2022, 58 Pages.

(Continued)

*Primary Examiner* — Jamaal Henson
(74) *Attorney, Agent, or Firm* — Holland & Hart LLP

(57) ABSTRACT

Methods, systems, and devices for wireless communications are described. The described techniques may allow for a user equipment (UE) to communicate with a network entity using full-duplex communication techniques. For example, the UE may transmit, to the network entity, an indication of respective quantities of transmit chains and receive chains at the UE supports for full-duplex and half-duplex communications. In some cases, the UE may identify one or more fixed subbands within a component carrier (CC) or one or more fixed CCs that are allocated for uplink transmissions, and the UE may identify one or more guard bands between the fixed uplink subbands or uplink CCs and one or more downlink subbands or downlink CCs, respectively. In some examples, the UE may identify a guard interval between half-duplex resources and full-duplex resources to allow time for the UE to switch between the half-duplex resources and the full-duplex resources.

18 Claims, 20 Drawing Sheets

(56)            References Cited

U.S. PATENT DOCUMENTS

| | | | |
|---|---|---|---|
| 2021/0176626 A1 | 6/2021 | Abdelghaffar et al. | |
| 2021/0258132 A1 | 8/2021 | Huang et al. | |
| 2021/0320779 A1* | 10/2021 | Huang | H04L 5/14 |
| 2021/0329646 A1* | 10/2021 | Fakoorian | H04W 72/53 |
| 2021/0352667 A1* | 11/2021 | Abotabl | H04L 5/14 |
| 2022/0287040 A1 | 9/2022 | Lee et al. | |
| 2024/0137896 A1* | 4/2024 | Chen | H04W 64/00 |
| 2025/0175314 A1* | 5/2025 | Liu | H04L 5/001 |

FOREIGN PATENT DOCUMENTS

| | | |
|---|---|---|
| WO | WO-2024044478 A1 | 2/2024 |
| WO | WO-2024096616 A1 | 5/2024 |

OTHER PUBLICATIONS

Chen B., et al., "FlexRadio: Fully Flexible Radios and Networks", Usenix, the Advanced Computing Systems Association, May 4, 2015, pp. 212-225, XP061024738, pp. 205-218, the whole document.

Partial International Search Report—PCT/US2024/031378—ISA/EPO—Sep. 23, 2024.

Intel Corporation: "Discussions on Subband Non-Overlapping Full Duplex", 3GPP TSG RAN WG1 #110bis-e, R1-2209052, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 17 Pages, XP052276971, p. 1-p. 5.

International Search Report and Written Opinion—PCT/US2024/031378—ISA/EPO—Dec. 10, 2024.

Xiaomi: "Discussion on Subband Non-Overlapping Full Duplex", 3GPP TSG RAN WG1 #112bis-e, R1-2302982, 3rd Generation Partnership Project, Mobile Competence Centre, 650, Route Des Lucioles, F-06921 Sophia-Antipolis Cedex, France, vol. 3GPP RAN 1, No. e-Meeting, Apr. 17, 2023-Apr. 26, 2023, Apr. 7, 2023, 39 Pages, XP052352451, p. 9-p. 12.

* cited by examiner

Subband/CC Structure 705-a

| Uplink Subband/CC 710-a | Unused Subband/CC 715 | Downlink Subband/CC 720-a | Downlink Subband/CC 720-b |

Frequency Range 725-a

Subband/CC Structure 705-b

| Downlink Subband/CC 720-c | Downlink Subband/CC 720-d | Uplink Subband/CC 710-b | Downlink Subband/CC 720-e |

Frequency Range 725-b

700

115-e

1105 — Identify Guard Interval Configuration

1110 — Half-Duplex Communications

1115 — Full-Duplex Communications 105-e

1100

1210

1220

1215

1205

1200

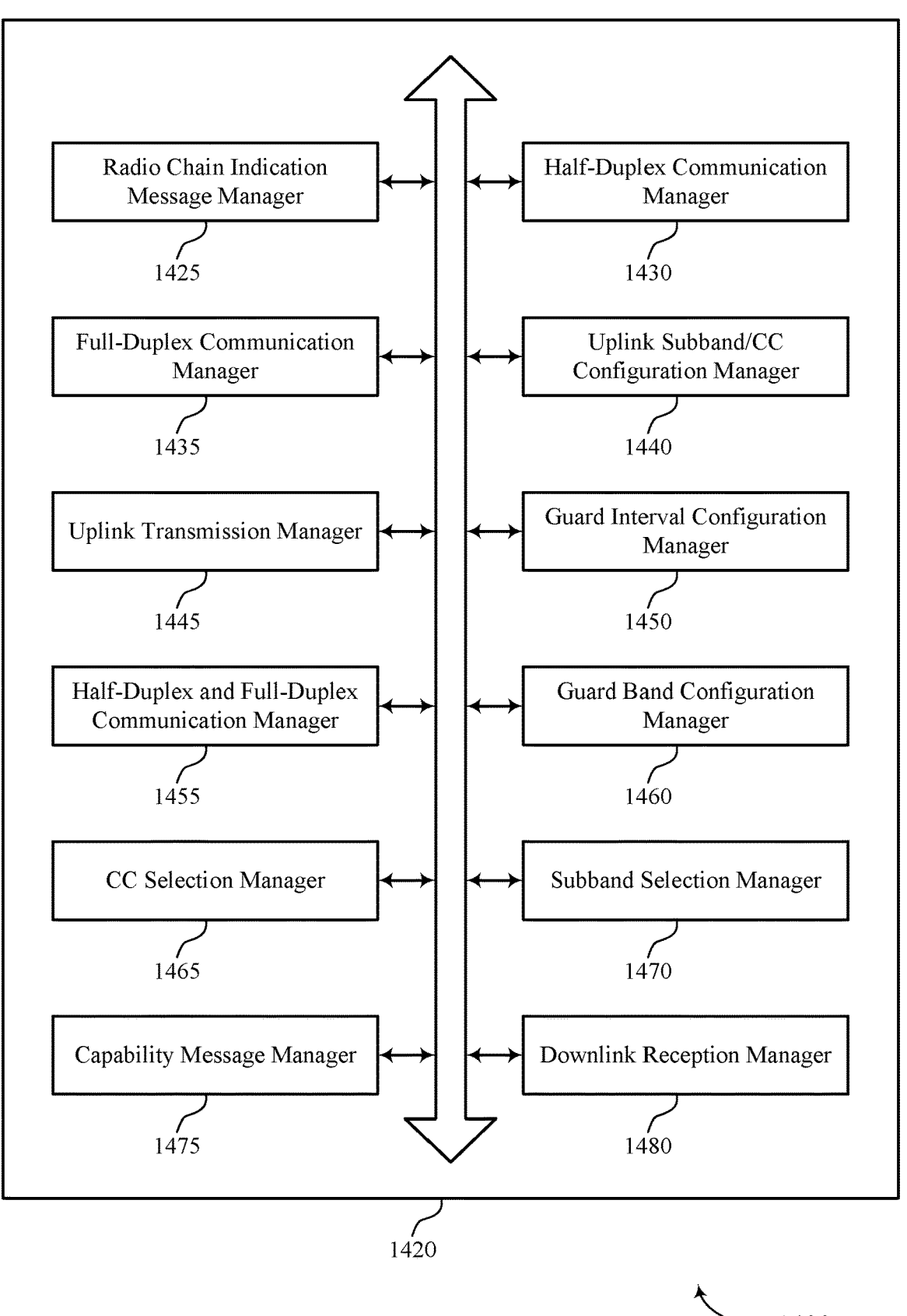

Radio Chain Indication Message Manager

1425

Full-Duplex Communication Manager

1435

Uplink Transmission Manager

1445

Half-Duplex and Full-Duplex Communication Manager

1455

CC Selection Manager

1465

Capability Message Manager

1475

Half-Duplex Communication Manager

1430

Uplink Subband/CC Configuration Manager

1440

Guard Interval Configuration Manager

1450

Guard Band Configuration Manager

1460

Subband Selection Manager

1470

Downlink Reception Manager

Figure 16:
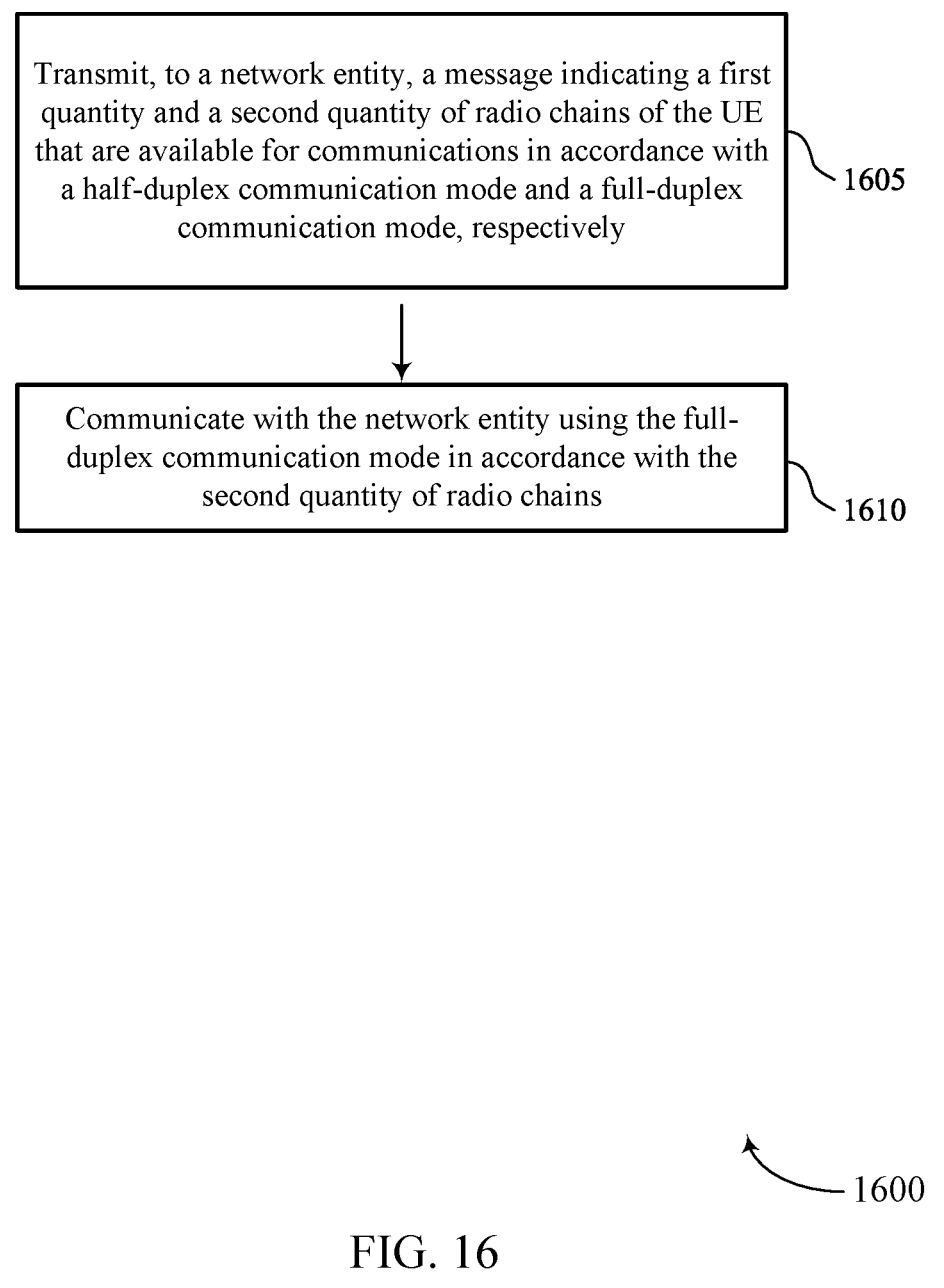

Transmit, to a network entity, a message indicating a first quantity and a second quantity of radio chains of the UE that are available for communications in accordance with a half-duplex communication mode and a full-duplex communication mode, respectively ⟍ 1605

Communicate with the network entity using the full-duplex communication mode in accordance with the second quantity of radio chains ⟍ 1610

Figure 17:
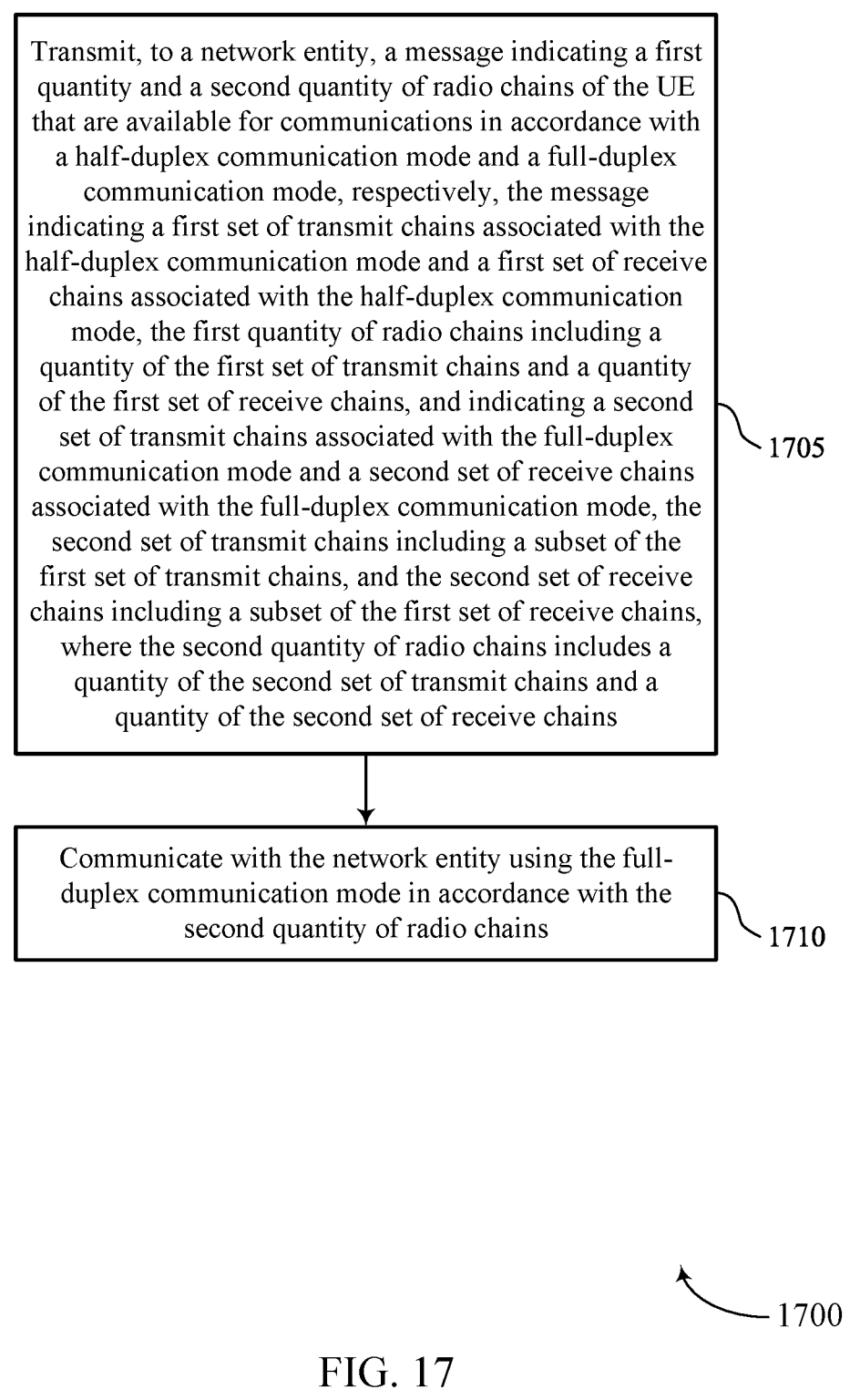

Transmit, to a network entity, a message indicating a first quantity and a second quantity of radio chains of the UE that are available for communications in accordance with a half-duplex communication mode and a full-duplex communication mode, respectively, the message indicating a first set of transmit chains associated with the half-duplex communication mode and a first set of receive chains associated with the half-duplex communication mode, the first quantity of radio chains including a quantity of the first set of transmit chains and a quantity of the first set of receive chains, and indicating a second set of transmit chains associated with the full-duplex communication mode and a second set of receive chains associated with the full-duplex communication mode, the second set of transmit chains including a subset of the first set of transmit chains, and the second set of receive chains including a subset of the first set of receive chains, where the second quantity of radio chains includes a quantity of the second set of transmit chains and a quantity of the second set of receive chains

1705

Communicate with the network entity using the full-duplex communication mode in accordance with the second quantity of radio chains

Figure 18:
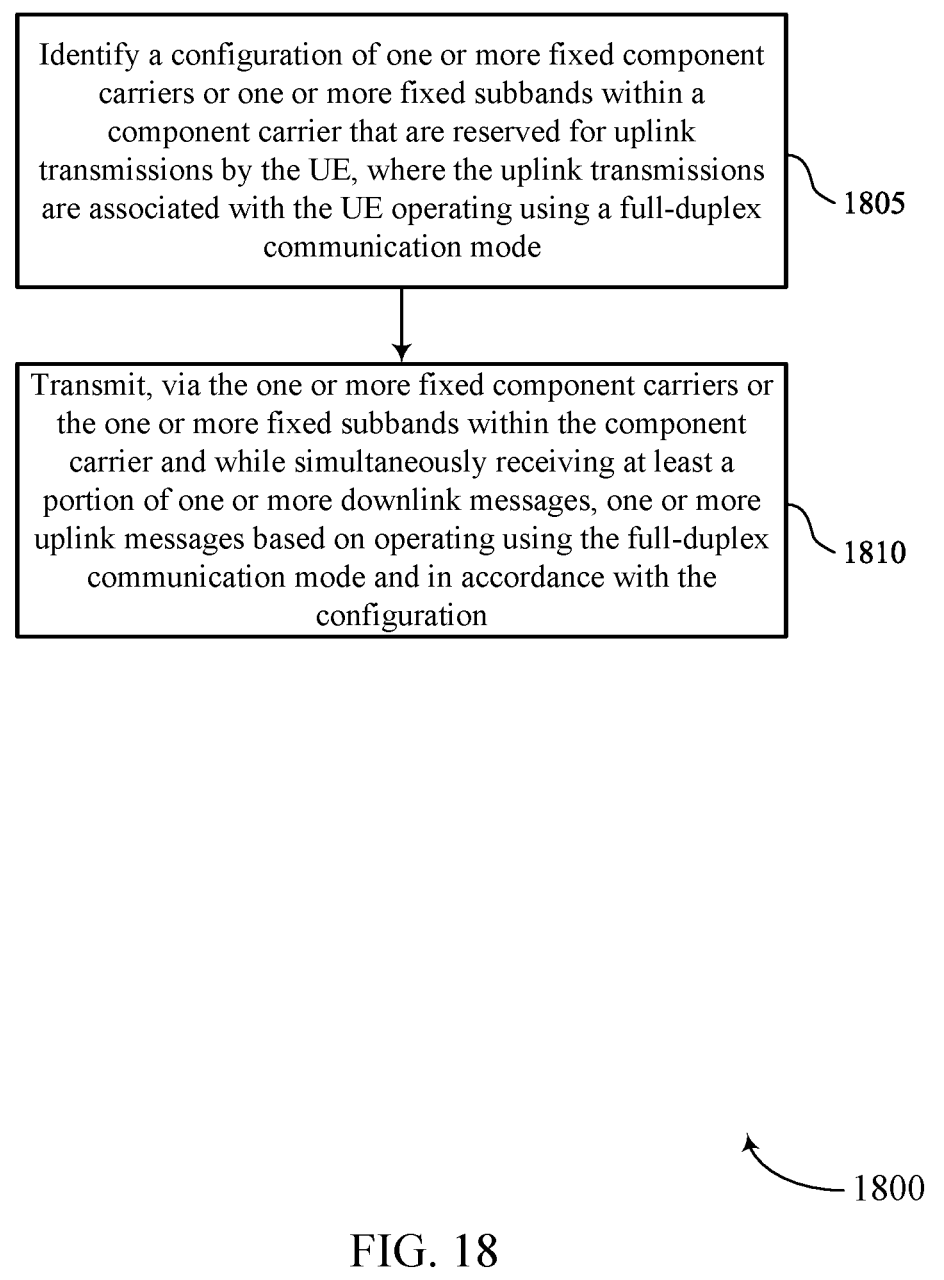

Identify a configuration of one or more fixed component carriers or one or more fixed subbands within a component carrier that are reserved for uplink transmissions by the UE, where the uplink transmissions are associated with the UE operating using a full-duplex communication mode

1805

Transmit, via the one or more fixed component carriers or the one or more fixed subbands within the component carrier and while simultaneously receiving at least a portion of one or more downlink messages, one or more uplink messages based on operating using the full-duplex communication mode and in accordance with the configuration

Figure 19:
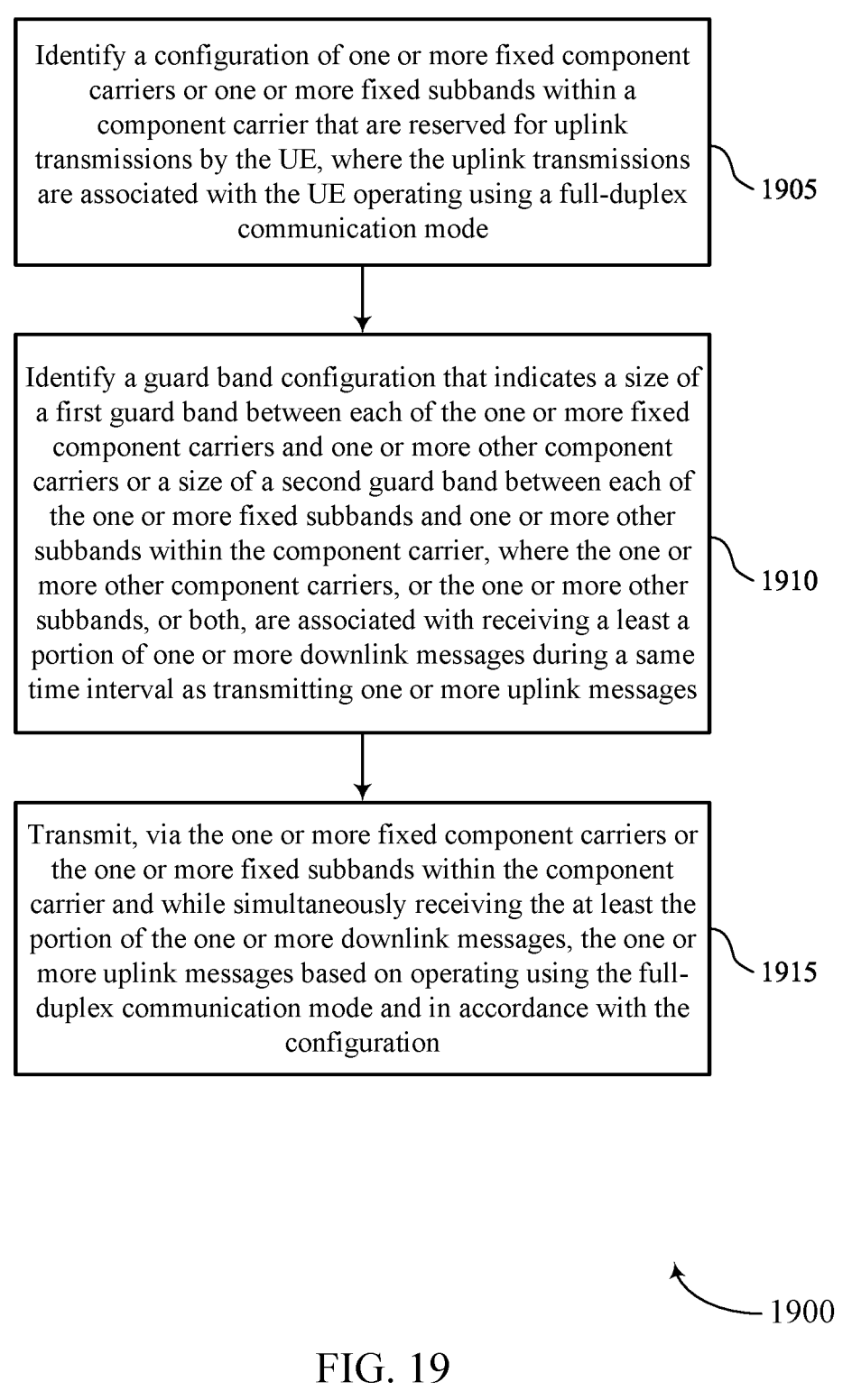

Identify a configuration of one or more fixed component carriers or one or more fixed subbands within a component carrier that are reserved for uplink transmissions by the UE, where the uplink transmissions are associated with the UE operating using a full-duplex communication mode

╲ 1905

Identify a guard band configuration that indicates a size of a first guard band between each of the one or more fixed component carriers and one or more other component carriers or a size of a second guard band between each of the one or more fixed subbands and one or more other subbands within the component carrier, where the one or more other component carriers, or the one or more other subbands, or both, are associated with receiving a least a portion of one or more downlink messages during a same time interval as transmitting one or more uplink messages

╲ 1910

Transmit, via the one or more fixed component carriers or the one or more fixed subbands within the component carrier and while simultaneously receiving the at least the portion of the one or more downlink messages, the one or more uplink messages based on operating using the full-duplex communication mode and in accordance with the configuration

Identify a configuration for a guard interval associated with switching between half-duplex communication resources and full-duplex communication resources, where the guard interval is based on the UE operating using a full-duplex communication mode

2005

Communicate with a network entity via the half-duplex communication resources and the full-duplex communication resources in accordance with the guard interval between the half-duplex communication resources and the full-duplex communication resources

2010

2000

FIG. 20

FULL-DUPLEX OPERATIONS FOR USER EQUIPMENTS

FIELD OF TECHNOLOGY

The following relates to wireless communications, including full-duplex operations for user equipments (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support full-duplex operations for user equipments (UEs). For example, the described techniques provide for a UE to communicate with a network entity (or one or more other wireless devices) using full-duplex communication techniques, where the UE simultaneously transmits and receives data. In some examples, the UE may transmit, to the network entity, an indication of the hardware available at the UE that supports full-duplex and half-duplex communications. The hardware available at the UE may include respective quantities of transmit chains and receive chains that are configured for full-duplex communications and half-duplex communications. In response to the indication, the network entity may schedule half-duplex and full-duplex communications in accordance with the communications supported by the UE's hardware. The hardware may include respective quantities of transmit chains and receive chains used for full-duplex and half-duplex operation. Additionally, or alternatively, the UE may identify one or more fixed subbands within a component carrier (CC) or one or more fixed CCs allocated for uplink transmissions for use in full-duplex communications, and the UE may further identify one or more guard bands between the fixed uplink subbands or uplink CCs and one or more downlink subbands or downlink CCs, respectively, to prevent or decrease interference between the simultaneous uplink transmission and downlink reception by the UE. Additionally, or alternatively, the UE may identify a guard interval (e.g., one or more symbols or a transient time period) between half-duplex resources and full-duplex resources to allow time for the UE to switch between the half-duplex resources and the full-duplex resources.

A method for wireless communications by a UE is described. The method may include transmitting, to a network entity, a message indicating a first quantity and a second quantity of radio chains of the UE that are available for communications in accordance with a half-duplex communication mode and a full-duplex communication mode, respectively, and communicating with the network entity using the full-duplex communication mode in accordance with the second quantity of radio chains.

A UE for wireless communications is described. The UE may include one or more memories storing processor executable code, and one or more processors coupled with the one or more memories. The one or more processors may individually or collectively operable to execute the code to cause the UE to transmit, to a network entity, a message indicating a first quantity and a second quantity of radio chains of the UE that are available for communications in accordance with a half-duplex communication mode and a full-duplex communication mode, respectively, and communicate with the network entity using the full-duplex communication mode in accordance with the second quantity of radio chains.

Another UE for wireless communications is described. The UE may include means for transmitting, to a network entity, a message indicating a first quantity and a second quantity of radio chains of the UE that are available for communications in accordance with a half-duplex communication mode and a full-duplex communication mode, respectively, and means for communicating with the network entity using the full-duplex communication mode in accordance with the second quantity of radio chains.

A non-transitory computer-readable medium storing code for wireless communications is described. The code may include instructions executable by one or more processors to transmit, to a network entity, a message indicating a first quantity and a second quantity of radio chains of the UE that are available for communications in accordance with a half-duplex communication mode and a full-duplex communication mode, respectively, and communicate with the network entity using the full-duplex communication mode in accordance with the second quantity of radio chains.

In some examples of the method, UEs, and non-transitory computer-readable medium described herein, transmitting the message indicating the first quantity and the second quantity of radio chains of the UE may include operations, features, means, or instructions for transmitting the message indicating a first set of transmit chains and a first set of receive chains each associated with the half-duplex communication mode, the first quantity of radio chains including a quantity of the first set of transmit chains and a quantity of the first set of receive chains.

In some examples of the method, UEs, and non-transitory computer-readable medium described herein, transmitting the message indicating the first quantity and the second quantity of radio chains of the UE may include operations, features, means, or instructions for transmitting the message indicating a second set of transmit chains and a second set of receive chains each associated with the full-duplex communication mode, the second set of transmit chains including a subset of the first set of transmit chains, and the second set of receive chains including a subset of the first set of receive chains, where the second quantity of radio chains includes a quantity of the second set of transmit chains and a quantity of the second set of receive chains.

In some examples of the method, UEs, and non-transitory computer-readable medium described herein, communicating with the network entity using the full-duplex communication mode may include operations, features, means, or instructions for transmitting signaling to the network entity using the second set of transmit chains via a first set of resources and receiving signaling from the network entity using the second set of receive chains via a second set of resources that at least partially overlap in time with the first set of resources.

In some examples of the method, UEs, and non-transitory computer-readable medium described herein, the second quantity of radio chains may be based on one or more capabilities of the UE.

In some examples of the method, UEs, and non-transitory computer-readable medium described herein, the one or more capabilities of the UE may be based on a quantity of radio chains used for time-division duplexing resources, a power class of the UE, a distance between antenna elements of the UE, an antenna configuration of the UE, one or more antenna components of the UE, or any combination thereof.

A method for wireless communications by a UE is described. The method may include identifying a configuration of one or more fixed CCs or one or more fixed subbands within a CC that are reserved for uplink transmissions by the UE, where the uplink transmissions are associated with the UE operating using a full-duplex communication mode and transmitting, via the one or more fixed CCs or the one or more fixed subbands within the CC and while simultaneously receiving at least a portion of one or more downlink messages, one or more uplink messages based on operating using the full-duplex communication mode and in accordance with the configuration.

A UE for wireless communications is described. The UE may include one or more memories storing processor executable code, and one or more processors coupled with the one or more memories. The one or more processors may individually or collectively operable to execute the code to cause the UE to identify a configuration of one or more fixed CCs or one or more fixed subbands within a CC that are reserved for uplink transmissions by the UE, where the uplink transmissions are associated with the UE operating using a full-duplex communication mode and transmit, via the one or more fixed CCs or the one or more fixed subbands within the CC and while simultaneously receiving one or more downlink messages, one or more uplink messages based on operating using the full-duplex communication mode and in accordance with the configuration.

Another UE for wireless communications is described. The UE may include means for identifying a configuration of one or more fixed CCs or one or more fixed subbands within a CC that are reserved for uplink transmissions by the UE, where the uplink transmissions are associated with the UE operating using a full-duplex communication mode and means for transmitting, via the one or more fixed CCs or the one or more fixed subbands within the CC and while simultaneously receiving one or more downlink messages, one or more uplink messages based on operating using the full-duplex communication mode and in accordance with the configuration.

A non-transitory computer-readable medium storing code for wireless communications is described. The code may include instructions executable by one or more processors to identify a configuration of one or more fixed CCs or one or more fixed subbands within a CC that are reserved for uplink transmissions by the UE, where the uplink transmissions are associated with the UE operating using a full-duplex communication mode and transmit, via the one or more fixed CCs or the one or more fixed subbands within the CC and while simultaneously receiving one or more downlink messages, one or more uplink messages based on operating using the full-duplex communication mode and in accordance with the configuration.

Some examples of the method, UEs, and non-transitory computer-readable medium described herein may further include operations, features, means, or instructions for identifying a guard band configuration that indicates a size of a first guard band between each of the one or more fixed CCs and one or more other CCs or a size of a second guard band between each of the one or more fixed subbands and one or more other subbands within the CC, where the one or more other CCs, or the one or more other subbands, or both, may be associated with receiving the one or more downlink messages during a same time interval as transmitting the one or more uplink messages.

In some examples of the method, UEs, and non-transitory computer-readable medium described herein, the guard band configuration may be identified based on one or more preconfigured guard band configurations.

Some examples of the method, UEs, and non-transitory computer-readable medium described herein may further include operations, features, means, or instructions for transmitting, to a network entity, a capability message including an indication of the guard band configuration, where the size of the first guard band or the size of the second guard band, or both, may be based on one or more capabilities of the UE.

Some examples of the method, UEs, and non-transitory computer-readable medium described herein may further include operations, features, means, or instructions for refraining from transmitting uplink messages via the one or more other CCs based on the one or more fixed CCs and the size of the first guard band and refraining from receiving downlink messages via the one or more fixed CCs based on the one or more fixed CCs and the size of the first guard band.

Some examples of the method, UEs, and non-transitory computer-readable medium described herein may further include operations, features, means, or instructions for refraining from transmitting uplink messages via the one or more other subbands within the CC based on the one or more fixed subbands and the size of the second guard band and refraining from receiving downlink messages via the one or more fixed subbands based on the one or more fixed subbands and the size of the second guard band.

Some examples of the method, UEs, and non-transitory computer-readable medium described herein may further include operations, features, means, or instructions for selecting a first fixed CC from the one or more fixed CCs based on one or more capabilities of the UE, where transmitting the one or more uplink messages may include transmitting the one or more uplink messages via the first fixed CC.

Some examples of the method, UEs, and non-transitory computer-readable medium described herein may further include operations, features, means, or instructions for selecting a first fixed subband from the one or more fixed subbands based on one or more capabilities of the UE, where transmitting the one or more uplink messages may include transmitting the one or more uplink messages via the first fixed subband.

In some examples of the method, UEs, and non-transitory computer-readable medium described herein, the one or more fixed CCs may be each associated with a preconfigured central frequency and a preconfigured bandwidth.

In some examples of the method, UEs, and non-transitory computer-readable medium described herein, the one or more fixed subbands within the CC may be each associated with a preconfigured central frequency and a preconfigured bandwidth.

In some examples of the method, UEs, and non-transitory computer-readable medium described herein, the one or more fixed subbands within the CC may be each associated with a first RB and a preconfigured quantity of RBs.

A method for wireless communications by a UE is described. The method may include identifying a configuration for a guard interval associated with switching between half-duplex communication resources and full-duplex communication resources, where the guard interval is based on the UE operating using a full-duplex communication mode and communicating with a network entity via the half-duplex communication resources and the full-duplex communication resources in accordance with the guard interval between the half-duplex communication resources and the full-duplex communication resources.

A UE for wireless communications is described. The UE may include one or more memories storing processor executable code, and one or more processors coupled with the one or more memories. The one or more processors may individually or collectively operable to execute the code to cause the UE to identify a configuration for a guard interval associated with switching between half-duplex communication resources and full-duplex communication resources, where the guard interval is based on the UE operating using a full-duplex communication mode and communicate with a network entity via the half-duplex communication resources and the full-duplex communication resources in accordance with the guard interval between the half-duplex communication resources and the full-duplex communication resources.

Another UE for wireless communications is described. The UE may include means for identifying a configuration for a guard interval associated with switching between half-duplex communication resources and full-duplex communication resources, where the guard interval is based on the UE operating using a full-duplex communication mode and means for communicating with a network entity via the half-duplex communication resources and the full-duplex communication resources in accordance with the guard interval between the half-duplex communication resources and the full-duplex communication resources.

A non-transitory computer-readable medium storing code for wireless communications is described. The code may include instructions executable by one or more processors to identify a configuration for a guard interval associated with switching between half-duplex communication resources and full-duplex communication resources, where the guard interval is based on the UE operating using a full-duplex communication mode and communicate with a network entity via the half-duplex communication resources and the full-duplex communication resources in accordance with the guard interval between the half-duplex communication resources and the full-duplex communication resources.

In some examples of the method, UEs, and non-transitory computer-readable medium described herein, the guard interval includes a quantity of symbols associated with switching between the half-duplex communication resources and the full-duplex communication resources.

In some examples of the method, UEs, and non-transitory computer-readable medium described herein, the configuration of the guard interval may be identified based on one or more preconfigured guard intervals.

In some examples of the method, UEs, and non-transitory computer-readable medium described herein, the quantity of symbols associated with switching between the half-duplex communication resources and the full-duplex communication resources may be based on one or more capabilities of the UE.

In some examples of the method, UEs, and non-transitory computer-readable medium described herein, the guard interval includes a transient time period associated with switching between the half-duplex communication resources and the full-duplex communication resources and the transient time period may be defined with regard to an absolute time.

BRIEF DESCRIPTION OF THE DRAWINGS

FIG. 14 shows a block diagram of a communications manager that supports full-duplex operations for UEs in accordance with one or more aspects of the present disclosure.

FIGS. 16 through 20 show flowcharts illustrating methods that support full-duplex operations for UEs in accordance with one or more aspects of the present disclosure.

DETAILED DESCRIPTION

Figure 1:
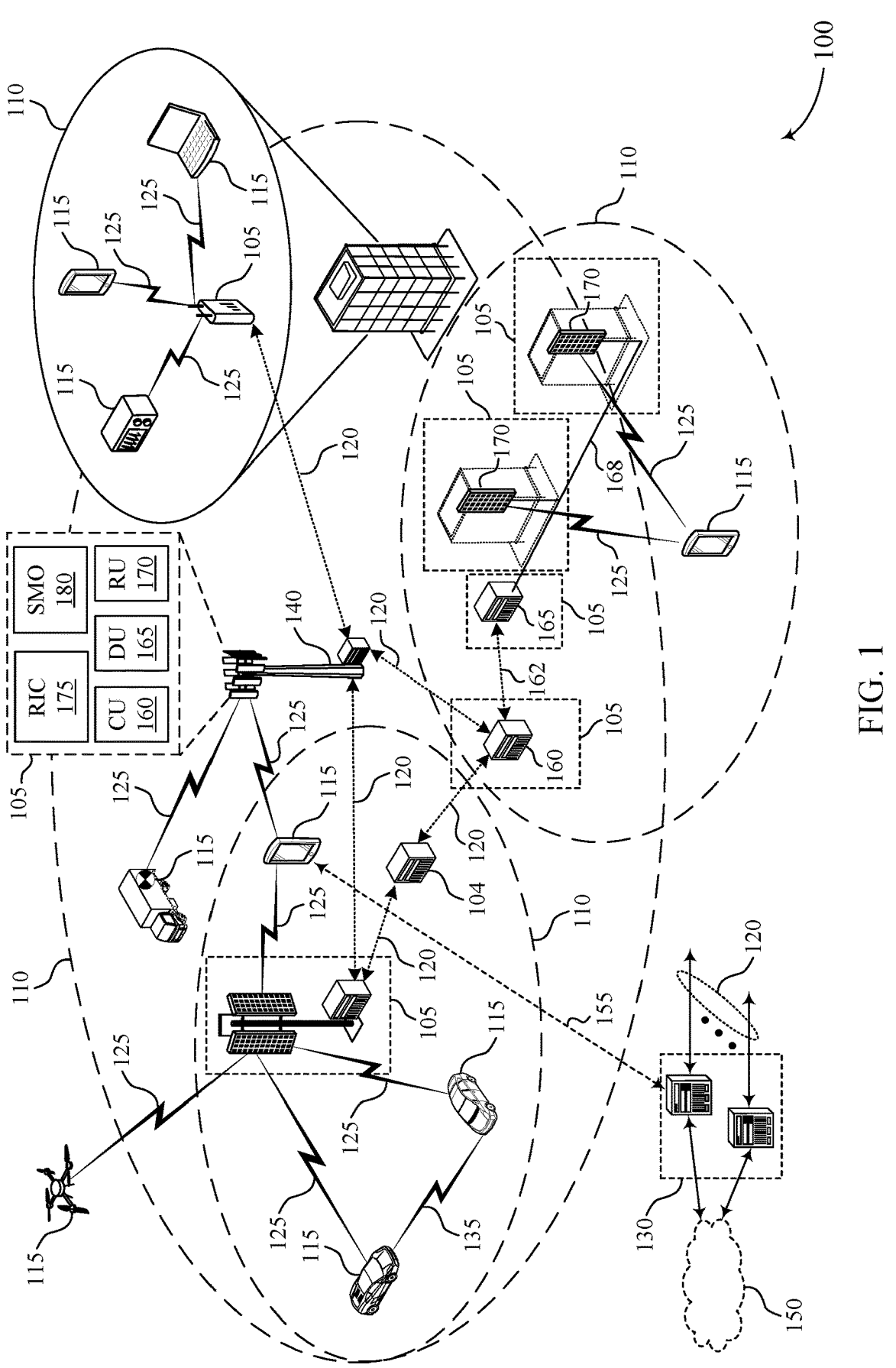
FIG. 1 shows an example of a wireless communications system that supports full-duplex operations for user equipments (UEs) in accordance with one or more aspects of the present disclosure.

In some wireless communications systems, a user equipment (UE) may communicate with a network entity using full-duplex communication techniques, such as subband full-duplex (SBFD) communications, in-band full-duplex (IBFD) communications, among other examples. For example, the UE may simultaneously receive downlink signaling from the network entity and transmit uplink signaling to the network entity via one or more full-duplex (e.g., SBFD, IBFD) slots. The UE may operate using full-duplex communications within subbands of a component carrier (CC) (e.g., a single CC with defined frequency subbands for uplink and downlink communications) or across respective CCs (e.g., a first set of one or more CCs for uplink communications and a second set of one or more CCs for downlink communications).

Such UEs may have various hardware configurations that support the full-duplex communications and half-duplex communications. For example, different UE may have different designs corresponding to respective hardware configurations, including different quantities of RF chains. In some aspects, some hardware configuration(s) of a UE may not be known by a network entity. The hardware configurations may include radio chains, such as transmit chains and receive chains, which may include sets of components (amplifiers, mixers, antennas, filters, attenuators, detectors, analog/digital convertors, or the like) arranged in or configured in a particular sequence for transmitting and receiving signaling. In some aspects, a receive chain, or a transmit chain, or both, may be referred to as a radio frequency (RF) chain (e.g., a transmit RF chain, a receive RF chain) that includes various components and circuitry for transmitting and/or receiving wireless communications. For instance, a UE may include a first quantity of receive chains, M, and a second quantity of transmit chains, N, for use in half-duplex communications. In full-duplex operations performed by the UE, however, the UE may use a subset of the receive chains and/or transmit chains (e.g., less than M receive chains and/or less than N transmit chains). The UE may additionally be affected by interference (e.g., self-interference (SI)) between at least partially overlapping uplink transmission and downlink reception as a result of a relatively close proximity of transmitting antenna panels and receiving antenna panels of the UE (e.g., as compared to a proximity between transmitting antenna panels and receiving antenna panels at the network entity). Additionally, switching between half-duplex communication resources (e.g., configured for downlink reception or uplink transmissions in time resources (e.g., slots)) and full-duplex communication resources may cause a switching delay as a result of time spent switching antenna components (e.g., antenna elements, antenna panels), radio chains, filters, and the like. That is, as a consequence of form factor, hardware configuration, operational parameters, among other examples, UEs may implement full-duplex communications differently than other devices (e.g., network entities) that are capable of full-duplex communications. Additionally, as some UEs may be capable of full-duplex communications (while others may not have such capabilities), it may be advantageous to indicate information to the network regarding the UE's capabilities, as well as the degree and performance with which such capabilities may be implemented by the UE (e.g., for simultaneous transmission and reception by the UE).

The techniques described herein may allow for the UE to efficiently communicate with the network entity (or one or more other wireless devices) using full-duplex communication techniques. For example, the UE may transmit, to the network entity (e.g., or to another wireless device), an indication of the UE's hardware that supports full-duplex and half-duplex communications. The hardware may include respective quantities of transmit chains and receive chains used for full-duplex and half-duplex operation. As an example, the UE may transmit a message indicating respective quantities of transmit and receive chains for half-duplex communications and respective quantities of transmit and receive chains for full-duplex communications. The quantity of transmit and/or receive chains for full-duplex communications may be less than the quantity of transmit and/or receive chains for half-duplex communications, and may be based on, for example, one or more capabilities of the UE, such as a power class of the UE, an antenna separation of the UEs antennas and/or antenna elements (e.g., a three-dimensional distance between respective antennas, a three-dimensional distance between respective antenna elements), an antenna design (e.g., a transmission/reception (TR) switching design or a circulator design), among other examples.

Additionally, or alternatively, the UE may identify one or more fixed subbands within a CC (e.g., or one or more fixed CCs) allocated for uplink transmissions. The UE may further identify one or more guard bands between uplink subbands or uplink CCs and downlink subbands or downlink CCs, respectively, to prevent or decrease interference at the UE between simultaneous uplink transmission and downlink reception. The UE may accordingly communicate with the network entity using the one or more fixed uplink subbands or fixed uplink CCs (e.g., and the one or more guard bands) with a relatively higher quality of communications as a result of the decreased interference. A size of the one or more guard bands may be based on a transmission power, a transmission priority, or an antenna configuration of the UE.

Additionally, or alternatively, the UE may identify a guard interval (e.g., one or more symbols or a transient time period) between half-duplex resources (e.g., half-duplex slots) and full-duplex resources (e.g., full-duplex slots) to allow for a switching delay. In some cases, the guard interval may be predefined (e.g., preconfigured). Additionally, or alternatively, the guard interval may be based on a capability of the UE (e.g., based on processing capabilities of the UE, based on hardware components of the UE, or the like). In some cases, the guard interval (e.g., a transient period) may be defined in terms of an absolute time (e.g., an absolute time associated with the network).

Aspects of the disclosure are initially described in the context of wireless communications systems. Aspects of the disclosure are further illustrated by and described with reference to circuit diagrams, resource diagrams, and process flow diagrams. Aspects of the disclosure are further illustrated by and described with reference to apparatus diagrams, system diagrams, and flowcharts that relate to full-duplex operations for UEs.

FIG. 1 shows an example of a wireless communications system 100 that supports full-duplex operations for UEs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support full-duplex operations for UEs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may support full-duplex communications, in which a UE 115 or a network entity 105 may perform simultaneous communication of downlink signaling and communication of uplink signaling on a frequency subband basis (e.g., across a set of frequencies). For example, the UE 115 may partition a particular band (e.g., 100 MHz) into sub-bands which the UE 115 may use exclusively for uplink or down-link communications. For example, the UE 115 may use the 40 MHz of a 100 MHz band for downlink communications, 20 MHz for uplink communications, and another 40 MHz again for downlink communications. That is, the uplink and downlink bands may have relatively similar frequencies, however, may be non-overlapping in frequency. Full-duplex communications may be suitable for macro cells with a large transmit power, and may be relatively simpler to enable than other full-duplex techniques. In addition, full-duplex communications may improve latency and increase uplink coverage via frequency division duplexing (FDD) in time division duplexing (TDD) bands.

To further enhance flexibility of some operations, the wireless communications system 100 may support UEs 115 and network entities 105 which may both perform simultaneous transmission and reception of downlink and uplink communications via partially or fully overlapping frequency bands. For example, the wireless communications system 100 may support a UE 115 and a network entity 105 that operate using full-duplex communications via partially overlapping frequency bands, or a network entity 105 that operates using half-duplex communications (e.g., in a multi-transmission reception point (mTRP)) scenario) and a UE 115 that operates using full-duplex communications.

In a TDD scenario, network entities 105 in the wireless communications system 100 may support full-duplex operations (e.g., where a network entity 105 may communicate simultaneously on uplink and downlink sub-bands that are non-overlapping in frequency), while UEs 115 may support half-duplex communications. For example, the network entity 105 may use a particular sub-band for transmitting downlink communications to a first UE 115, and a particular sub-band for receiving simultaneous uplink communications from a second UE 115. As such, a UE 115 capable of half-duplex communications may be paired with any network entity 105 capable of full-duplex operations in the wireless communications system 100.

In some examples, the network entity 105 may use IBFD communications, in which the network entity 105 may transmit and receive communications with a UE 115 via a same time resource and a same frequency resource. That is, the downlink and uplink may share same IBFD time and frequency resources, which may partially or fully overlap. Alternatively, the network entity 105 may use sub-band FDD (e.g., flexible duplex) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

Techniques described herein may allow for a UE 115 to efficiently communicate with other wireless devices (e.g., one or more UEs 115, one or more network entities 105, among other examples) using full-duplex communication techniques. For example, the UE 115 may transmit, to the network entity 105 (e.g., or to another device), an indication of the physical hardware available to the UE 115 (e.g., respective radio chains of the UE) that supports full-duplex and half-duplex communications. The availability of hardware (such as RF chains) may be based on some parameters or information available to the UE 115 that define which, and how many, components and/or sub-components are included in the UE 115 and that the UE 115 may use for wireless communications. As an example, a UE 115 may be built with various (predefined) capabilities (e.g., based on the intended design and functionality of the UE 115), and the availability of hardware components may be based on the capabilities. Here, the UE 115 may identify one or more capabilities corresponding to, and which indicate, the hardware components (such as transmit chains and/or receive chains for different types of communications) that are included in the UE 115. Based on the identified capabilities, the UE 115 may indicate the available hardware (and respective quantities thereof) available to the UE 115.

The available hardware may refer to one or more electronic components or sub-components that are included in the UE 115 (e.g., based on a build, design, functionality, or form factor of the UE 115) that the UE 115 may use for, and which are configured to enable, wireless communications by the UE 115. The hardware may include respective quantities of transmit chains and receive chains used for full-duplex communication, as well as respective quantities of transmit chains and receive chains used for half-duplex communication. That is, the UE 115 may indicate how many RF chains of the UE 115 support full-duplex operation, and how many RF chains of the UE 115 support half-duplex operation. Additionally, or alternatively, the UE 115 may identify one or more fixed subbands within a CC or one or more fixed CCs allocated for uplink transmissions. Here, the one or more fixed subbands may refer to subbands that each have respective indices and are predefined for uplink transmissions, where such subbands are not used for other types of transmissions. Likewise, the one or more fixed CCs may refer to CCs that each have respective indices and are predefined for uplink transmissions, where such subbands are not used for other types of transmissions. In some aspects, the UE 115 may further identify one or more guard bands (e.g., including one or more frequency bands, where each frequency band includes a specific range of frequencies in the electromagnetic frequency spectrum) between the uplink subbands or uplink CCs and downlink subbands or CCs, respectively, to prevent or decrease interference between simultaneous uplink transmission and downlink reception at the UE 115. The UE 115 may accordingly communicate with the network entity 105 using the one or more fixed uplink subbands or CCs (e.g., and the one or more guard bands) with a relatively higher quality of communications as a result of the decreased interference. Additionally, or alternatively, the UE 115 may identify a guard interval (e.g., a time interval, a time period, a time duration, including one or more OFDM symbols, and which may be referred to as a transient time period) between half-duplex resources (e.g., half-duplex slots) and full-duplex resources (e.g., full-duplex slots) to allow for the UE 115 to switch between filters used for half-duplex communications and filters used for full-duplex communications.

Figure 2:
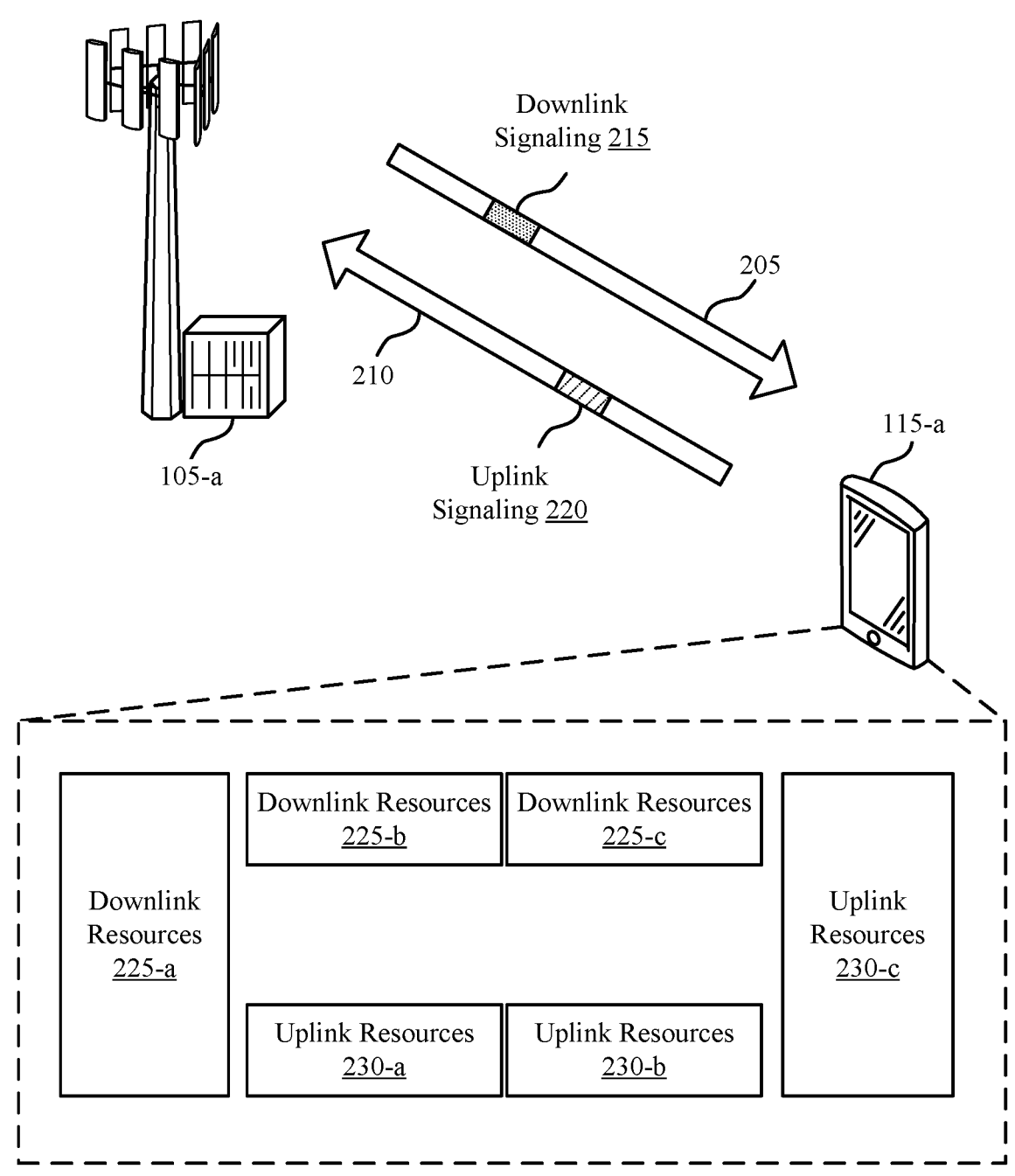
FIG. 2 shows an example of a wireless communications system that supports full-duplex operations for UEs in accordance with one or more aspects of the present disclosure.

FIG. 2 shows an example of a wireless communications system 200 that supports full-duplex operations for UEs in accordance with one or more aspects of the present disclosure. The wireless communications system 200 may implement or may be implemented by aspects of the wireless communications system 100. For example, the wireless communications system 200 may include a UE 115 (e.g., a UE 115-*a*) and a network entity 105 (e.g., a network entity 105-*a*), which may be examples of the corresponding devices as described with reference to FIG. 1.

In some wireless communication systems, such as the wireless communications system 200, a UE 115-*a* and a network entity 105-*a* may communicate signaling over one or more channels. For example, the network entity 105-*a* may transmit downlink signaling 215 to the UE 115-*a* via a downlink channel 205. The UE 115-*a* may transmit uplink signaling 220 to the network entity 105-*a* via an uplink channel 210. Such wireless communications systems may support half-duplex communications in which a device may either transmit or receive at a single time. That is, in slots reserved for half-duplex communications at the UE 115-*a*, the UE 115-*a* may either receive downlink signaling 215 (e.g., via downlink resources 225-*a*) or transmit uplink signaling 220 (e.g., via uplink resources 230-*c*). For example, if the UE 115-*a* is engaging in uplink communications, the UE 115-*a* may filter out any signaling that is incoming from the network entity 105-*a* via the downlink channel 205.

Additionally, or alternatively, the UE 115-*a* may support full-duplex communications, in which the UE 115-*a* may perform simultaneous reception of downlink signaling 215 and transmission of uplink signaling 220. Such full-duplex communications may occur on a frequency subband basis or on a CC basis (e.g., across a set of frequencies). That is, in slots reserved for full-duplex communications at the UE 115-*a*, the UE 115-*a* may both receive downlink signaling (e.g., via downlink resources 225-*b* and/or downlink resources 225-*c*) and transmit uplink signaling (e.g., via uplink resources 230-*a* and/or uplink resources 230-*b*), where the downlink resources 225-*b* and the uplink resources 230-*a* may overlap in the time domain. In some other examples, uplink and downlink resources may overlap in both the time domain and a frequency domain to enable full-duplex communications by the UE 115-*a*.

In some examples, full-duplex communications by the UE 115-*a* may be associated with unique or different challenges compared to full-duplex communications by other devices, such as the network entity 105-*a*, which may be based on capabilities of the UE 115-*a* (e.g., a processing capability of the UE 115-*a*, a hardware design of the UE 115-*a*, among other examples). For example, the network entity 105-*a* may have relatively larger antenna panels or a relatively larger spacing between antenna panels, as compared to the UE 115-*a*, which may allow for the network entity 105-*a* to incur relatively less interference while communicating using full-duplex techniques (e.g., using a relatively smaller frequency guard band between uplink resources and downlink resources and without modifications to antenna designs). However, for supporting full-duplex communications, the UE 115-*a* may have separate antenna panels used for transmission of uplink signaling and reception of downlink signaling, or may use a single shared antenna with an enhanced antenna design (e.g., a circulator or a duplexer antenna design). Additionally, or alternatively, the UE 115-*a* may utilize a transmission or reception analog filter, an analog interference canceller (AIC), or a receive filter to improve frequency isolation between uplink resources and downlink resources and thus to reduce interference. The UE 115-*a* may, additionally, or alternatively, use a digital interference cancellation such as non-linear interference cancellation (NLIC) to capture non-linearity impairments resulting from power amplifiers at the network entity 105-*a* or the UE 115-*a* (e.g., using one or more kernels generated from transmission samples or feedback receivers (FBRX)). Such antenna designs are described in further detail with reference to FIGS. 3 and 4.

In some implementations, the UE 115-*a* may use a first quantity M of transmit chains (e.g., transmit RF chains for transmitting signaling via the uplink channel 210) and a second quantity N of receive chains (e.g., receive RF chains for receiving signaling via the downlink channel 205) while operating in a half-duplex mode. The UE 115-*a* may use a subset of the M transmit chains and N receive chains (e.g., fewer than M and N transmit chains and receive chains, respectively) while operating in a full-duplex mode. Each RF chain (e.g., transmit chain, receive chain) may include a series of electronic components and/or sub-components configured for transmitting wireless signals, where such electronic components/sub-components of the transmit chain may include at least one of, for example, one or more filters (e.g., low pass, high pass, bandpass or other types of filters for filtering unwanted RF interference, such as out-of-band (OOB) signals), one or more RF switches (e.g., components configured for controlling one or more signal paths), one or more RF conversion components (e.g., components configured for converting an RF signal to an analog baseband), one or more RF power amplifiers (e.g., components for converting relatively low-power signals to relatively high-power signals for transmission via one or more antennas), low-noise amplifiers (e.g., components configured for amplifying relatively weak signals with relatively minimal noise introduction to the signals), one or more mixers (e.g., components configured for frequency conversion), or one or more tuners (e.g., components configured for matching an impedance of one or more antennas to an impedance of the RF system), among other examples.

To support efficient full-duplex communications by the UE 115-*a*, the UE 115-*a* may accordingly report, to the network entity 105-*a*, the quantities M and N of transmit and receive chains for use in half-duplex communications and respective quantities of transmit and receive chains in the subsets of transmit and receive chains for use in full-duplex (e.g., SBFD, IBFD) communications. Such radio chain reporting techniques may allow for the UE 115-*a* to communicate using both half-duplex and full-duplex communication techniques, which may decrease latency and improve efficiency in the wireless communications system 200. In such cases, the signaling may indicate, to the network, the various hardware capabilities of the UE 115-*a* for supporting full-duplex communications, and full-duplex communications may accordingly be configured or be performed based, at least in part, on the capabilities of the UE 115-*a*.

In some cases, to reduce interference between uplink and downlink signaling, the UE 115-*a* may utilize a relatively larger frequency guard band between uplink resources 230 and downlink resources 225 (e.g., relatively larger than a guard band utilized by the network entity 105-*a*). In some implementations, the UE 115-*a* may identify a configuration of one or more fixed uplink subbands within a CC (e.g., one or more uplink subbands having a location in a frequency domain in accordance with a set of parameters, which may be predefined, preconfigured, unchanging, or any combination thereof) or one or more fixed uplink CCs (e.g., one or more uplink CCs having a location in a frequency domain in accordance with a set of parameters, which may be predefined, preconfigured, unchanging, or any combination thereof) reserved for uplink signaling 220 during full-duplex (e.g., SBFD, IBFD) communications. The UE 115-*a* may, additionally, or alternatively, identify a configuration for one or more frequency guard bands between the fixed subbands or CCs reserved for uplink signaling and one or more other subbands or CCs reserved for downlink signaling during the full-duplex communications. Such uplink subband/CC and guard band configurations may reduce interference between uplink signaling and downlink signaling and may thus improve a quality of communications of the UE 115-*a*.

In some cases, the UE 115-*a* may switch from communicating using resources reserved for half-duplex communications to resources reserved for full-duplex communications (e.g., or vice-versa), which may be performed over a duration of time as a result of time needed for switching antenna panels, filters, and the like. The duration of time which the UE 115-a may spend switching from half-duplex communication resources to full-duplex (e.g., SBFD, IBFD) communication resources may be referred to as a switching delay, a guard interval, or some similar terminology, and may be based on one or more capabilities of the UE 115-a. Accordingly, in some implementations, the UE 115-a may identify a configuration for a guard interval (e.g., a quantity of symbols or a transient time period) between half-duplex communication resources and full-duplex communication resources to account for the switching delay. Such guard interval configurations may allow for the UE 115-a to communicate using both half-duplex and full-duplex communication techniques, which may decrease latency and improve efficiency in the wireless communications system 200.

Figure 3:
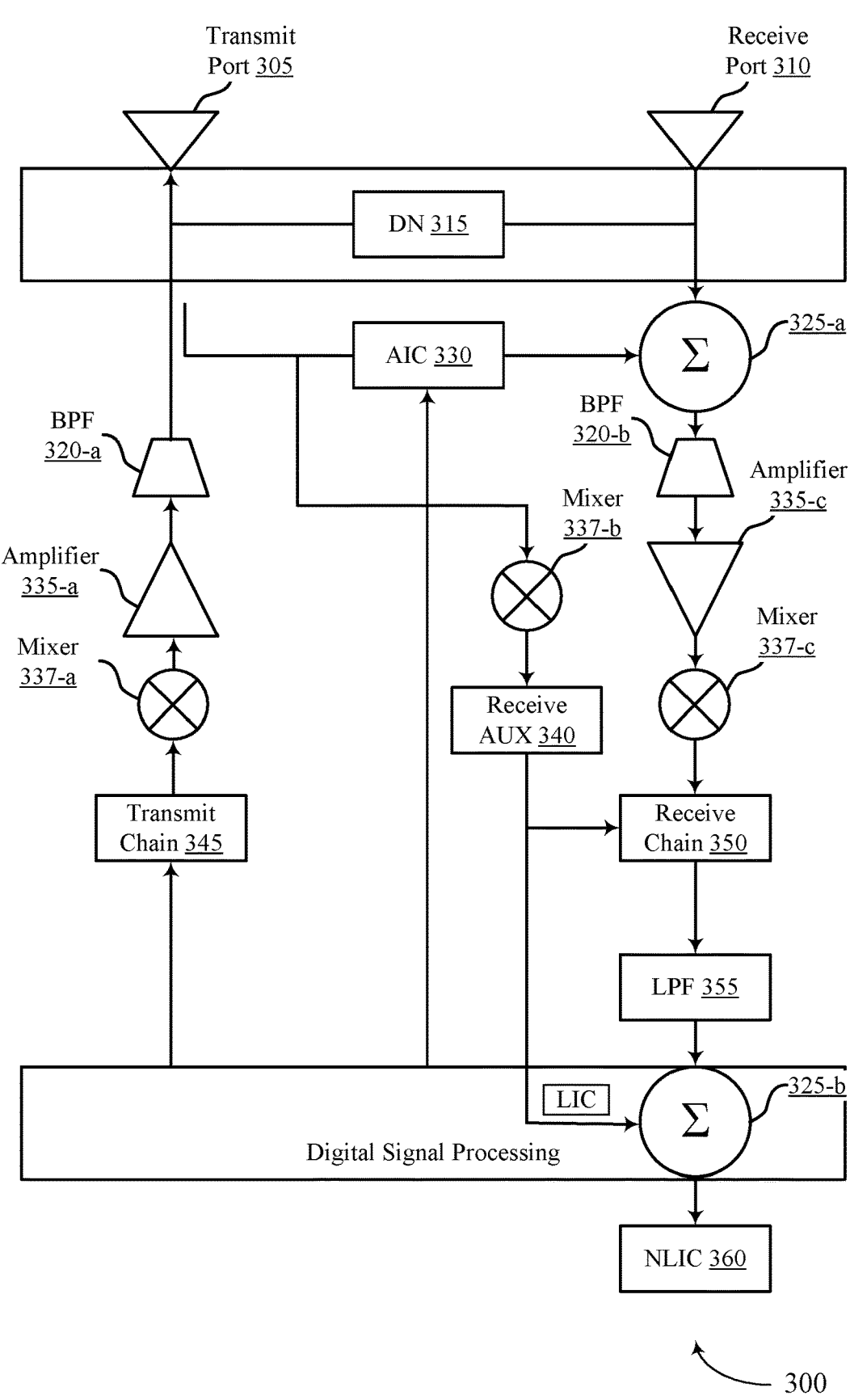
FIG. 3 shows an example of a circuit diagram that supports full-duplex operations for UEs in accordance with one or more aspects of the present disclosure.

FIG. 3 shows an example of a circuit diagram 300 that supports full-duplex operations for UEs in accordance with one or more aspects of the present disclosure. The circuit diagram 300 may implement or may be implemented by aspects of the wireless communications system 100 or the wireless communications system 200. For example, the circuit diagram 300 may illustrate an example of one or more components of a UE, which may be an example of a UE 115 described with reference to FIG. 1. The circuit diagram 300 may be an example of components configured for implementing full-duplex communications at a UE 115. However, one or more different components of the circuit diagram 300 (e.g., having one or more different configurations) may be used to perform the same or similar functions and operations described with reference to the circuit diagram 300 (e.g., one or more component described herein may be modified or substituted for one or more other components), and the features described with reference to the circuit diagram 300 should not be considered limiting to the scope the claims or the description.

To support full-duplex communications by a UE 115, the UE 115 may utilize a transmission/reception (TR) switching antenna design. For example, the UE 115 may transmit signaling to a network entity 105 using an antenna at a transmit port 305 and may receive signaling from the network entity 105 using an antenna at a receive port 310. In some examples, the UE 115 may use a decoupling network (DN) 315 to increase isolation between the transmit port 305 and the receive port 310.

To transmit uplink signaling, the UE 115 may pass a signal through one or more transmit chains 345, which may include one or more components, as described herein. After upconversion via a mixer 337-a (e.g., an upconversion mixer), the UE 115 may amplify the signal using a power amplifier 335-a and may filter the amplified signal using a subband band pass filter (BPF) 320-a. The UE 115 may transmit the filtered signal via the transmit port 305.

To receive downlink signaling, the UE 115 may receive one or more signals via the receive port 310. To reduce interference, the UE 115 may combine the one or more signals with an output of an AIC 330 via a summer 325-a (e.g., a summation component). In some aspects, the AIC 330 may be configured to cancel interference between a transmitter and a receiver, for example, by matching gain and phase of a wireless coupling path signal. The UE 115 may filter the combined signals using a subband BPF 320-b, and may amplify the filtered signal using an amplifier 335-c, which may be subsequently downconverted to baseband via a mixer 337-c (e.g., a downconversion mixer). In some examples, the UE 115 may downconvert feedback measured from uplink transmissions using a mixer 337-b (e.g., a downconversion mixer) and pass the feedback through one or more receive auxiliary (AUX) components 340. The UE 115 may pass the signal and the feedback through one or more receive chains 350, which may include one or more circuit components as described herein. The UE 115 may further filter the signals using a low pass filter (LPF) 355. The UE 115 may combine the filtered signal and the feedback via a summer 325-b (e.g., a summation component). To further decrease interference (e.g., interference resulting from one or more power amplifiers of the UE 115), the UE 115 may perform digital interference cancelation (e.g., linear interference cancellation (LIC) or NLIC 360) on the signal.

In some implementations, the UE 115 may not transmit via the transmit port 305 and receive via the receive port 310 simultaneously (e.g., for half-duplex communications). Thus, the UE 115 may use relatively fewer transmit chains 345 and receive chains 350, respectively, during full-duplex (e.g., SBFD, IBFD) communications than during half-duplex communications. As described herein, for performing full-duplex operations at the UE 115 (e.g., the UE 115 is capable of simultaneously transmitting and receiving signaling) the UE 115 may report respective quantities of transmit chains 345 and receive chains 350 that the UE 115 uses for half-duplex communications and full-duplex communications to a network entity 105 (or to another device).

Figure 4:
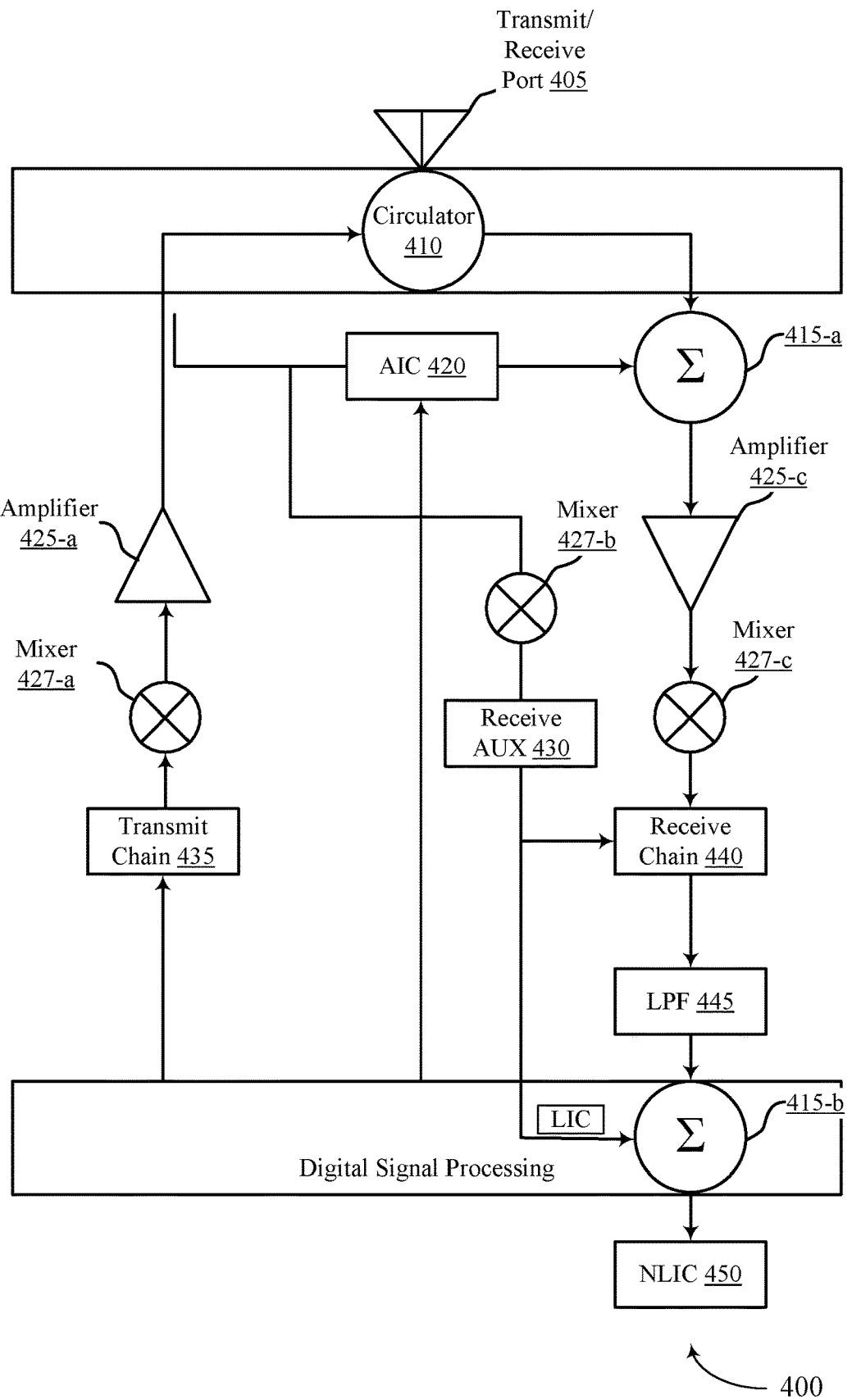
FIG. 4 shows an example of a circuit diagram that supports full-duplex operations for UEs in accordance with one or more aspects of the present disclosure.

FIG. 4 shows an example of a circuit diagram 400 that supports full-duplex operations for UEs in accordance with one or more aspects of the present disclosure. The circuit diagram 400 may implement or may be implemented by aspects of the wireless communications system 100, the wireless communications system 200, or the circuit diagram 300. For example, the circuit diagram 400 may illustrate an example of one or more components of a UE, which may be an example of a UE 115 described with reference to FIG. 1. The circuit diagram 400 may be an example of components configured for implementing full-duplex communications at a UE 115. However, one or more different components of the circuit diagram 400 (e.g., having one or more different configurations) may be used to perform the same or similar functions and operations described with reference to the circuit diagram 400 (e.g., one or more component described herein may be modified or substituted for one or more other components), and the features described with reference to the circuit diagram 400 should not be considered limiting to the scope the claims or the description.

To support full-duplex communications at a UE 115 (e.g., the UE 115 concurrently transmits and receives signaling), the UE 115 may utilize an antenna design with a circulator 410. For example, the UE 115 may transmit signaling to and receive signaling from a network entity 105 using an antenna at a transmit/receive port 405 using the circulator 410. In some examples, the UE 115 may use a duplexer to filter signaling at the transmit/receive port 405 and thus to reduce interference between uplink transmission and downlink reception.

To transmit uplink signaling, the UE 115 may pass a signal through one or more transmit chains 435, which may include one or more circuit components as described herein. After upconversion (e.g., via a mixer 427-a, which may be an example of an upconversion mixer), the UE 115 may amplify the signal using a power amplifier 425-a. The UE 115 may transmit the signal via the transmit/receive port 405 (e.g., using one or more antennas).

To receive downlink signaling, the UE 115 may receive one or more signals via the transmit/receive port 405. To reduce interference, the UE 115 may combine the one or more signals with an output of an AIC 420 via a summer 415-*a* (e.g., a summation component). In some aspects, the AIC 420 may be configured to cancel interference between a transmitter and a receiver, for example, by matching gain and phase of a wireless coupling path signal. The UE 115 may amplify the filtered signal using an amplifier 425-*c*, and the signal may be downconverted (e.g., downconverted to baseband) at mixer 427-*c* (e.g., a downconversion mixer). In some aspects, the UE 115 may perform downconversion of an uplink signal to baseband using a mixer 427-*b* (e.g., a downconversion mixer) and pass the feedback through one or more receive AUX components 430. The UE 115 may further pass the signal and the feedback through one or more receive chains 440, which may include one or more circuit or electronic components as described herein. The UE 115 may filter the signals using a LPF 445. The UE 115 may combine the filtered signal and the feedback via a summer 415-*b* (e.g., a summation component). To further decrease interference (e.g., interference resulting from one or more power amplifiers of the UE 115), the UE 115 may perform digital interference cancelation (e.g., LIC or NLIC 450) on the signal.

As described herein, when a UE 115 is performing full-duplex operations (e.g., simultaneous transmission and reception of signaling by the UE 115), the UE 115 may use relatively fewer transmit chains 435 and receive chains 440, respectively, during full-duplex (e.g., SBFD, IBFD) communications than during half-duplex communications. Accordingly, the UE 115 may report respective quantities of transmit chains 435 and receive chains 440 which the UE 115 may use during half-duplex communications and full-duplex communications to the network entity 105.

Figure 5:
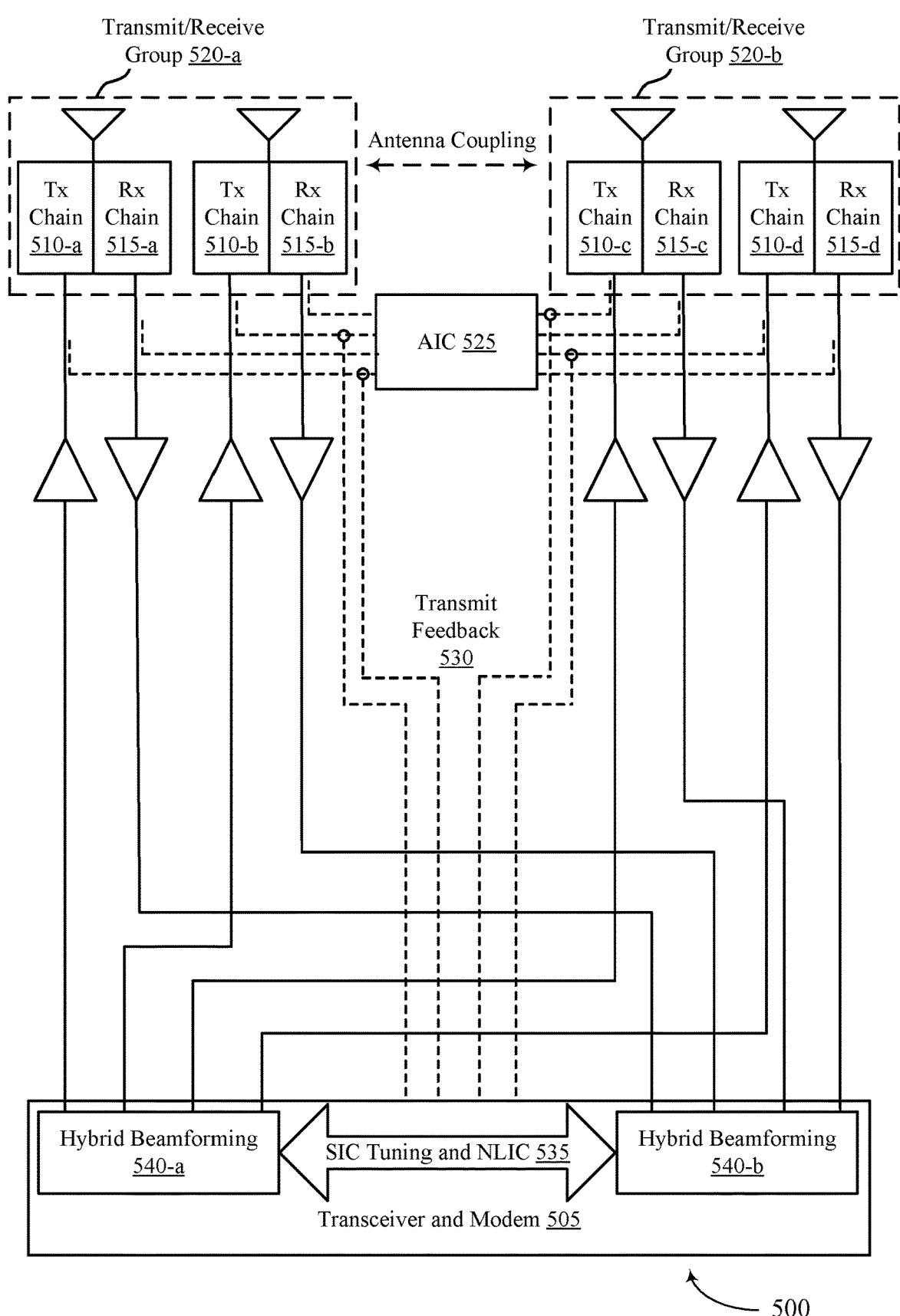
FIG. 5 shows an example of a circuit diagram that supports full-duplex operations for UEs in accordance with one or more aspects of the present disclosure.

FIG. 5 shows an example of a circuit diagram 500 that supports full-duplex operations for UEs in accordance with one or more aspects of the present disclosure. The circuit diagram 500 may implement or may be implemented by aspects of the wireless communications system 100, the wireless communications system 200, the circuit diagram 300, or the circuit diagram 400. For example, the circuit diagram 500 may illustrate an example of one or more components of a UE, which may be an example of a UE 115 described with reference to FIG. 1. The circuit diagram 500 may be an example of components configured for implementing full-duplex communications at a UE 115. However, one or more different components of the circuit diagram 500 (e.g., having one or more different configurations) may be used to perform the same or similar functions and operations described with reference to the circuit diagram 500 (e.g., one or more component described herein may be modified or substituted for one or more other components), and the features described with reference to the circuit diagram 500 should not be considered limiting to the scope the claims or the description.

In some aspects, a UE 115 may include a transceiver and modem 505 via which the UE 115 may perform hybrid beamforming 540 (e.g., hybrid digital and analog beamforming). For example, the UE 115 may perform hybrid beamforming 540-*a* to generate uplink beams to transmit uplink signaling, and hybrid beamforming 540-*b* to generate downlink beams to receive downlink signaling. The UE 115 may transmit the uplink signaling and receive the downlink signaling using one or more radio chains, such as transmit (Tx) chains 510 or receive (Rx) chains 515.

In some examples, the UE 115 may be affected by interference between the uplink signaling and the downlink signaling (e.g., in full-duplex communications). Accordingly, the UE 115 may perform, at 525, AIC (e.g., canceling interference between one or more transmit chains and one or more receive chains, for example, by matching gain and phase of a wireless coupling path signal). for each of the transmit chains 510 and receive chains 515. Further, the UE 115 may measure transmit feedback 530 from each of the transmit chains 510, and may perform successive interference cancellation (SIC) tuning and NLIC 535 using the measured transmit feedback 530 (e.g., via the transceiver and modem 505).

The UE 115 may include one or both of a TR switching antenna design or a circulator antenna design (e.g., as described with reference to FIGS. 3 and 4, respectively). In the example of the TR switching antenna design, the UE 115 may use each antenna for either transmitting or receiving. Such antenna designs may be relatively smaller than circulator antenna designs and may be more feasible in some frequency ranges (FRs) (e.g., FR3). However, such designs may involve a switching time (e.g., a time spent switching from a transmitting antenna to a receiving antenna). In the example of a circulator antenna design, the UE 115 may use each antenna for both of transmitting and receiving. In some cases, such antenna designs may be relatively bulky (e.g., result in a relatively larger form factor of the UE 115) as compared to some TR switching designs, but may not involve a switching time.

In some cases, the UE 115 may operate in a half-duplex communication mode in which the UE 115 may receive the downlink signaling and transmit the uplink signaling in different time resources. In such examples, the UE 115 may use a quantity (e.g., M) of receive chains 515 (e.g., a receive chain 515-*a*, a receive chain 515-*b*, a receive chain 515-*c*, a receive chain 515-*d*) to receive the downlink signaling via time-domain resources (e.g., slots) reserved for downlink communications. The UE 115 may use a quantity (e.g., N) of transmit chains 510 (e.g., a transmit chain 510-*a*, a transmit chain 510-*b*, a transmit chain 510-*c*, a transmit chain 510-*d*) to transmit the uplink signaling via time-domain resources (e.g., slots) reserved for uplink communications.

In some cases, the UE 115 may operate in a full-duplex communication mode (e.g., SBFD, IBFD) in which the UE 115 may receive the downlink signaling and transmit the uplink signaling via the same or overlapping time resources. Put another way, the full-duplex communication mode of the UE 115 may include the UE 115 simultaneously transmitting signaling and receiving signaling. In such examples, the UE 115 may use a quantity (e.g., $M_1$) of receive chains 515 and a quantity (e.g., $N_1$) of transmit chains 510 in slots reserved for full-duplex communications (e.g., X slots in a DXXU slot format for TDD). The quantity $M_1$ and the quantity $N_1$ may be subsets of (e.g., less than) the quantity M and the quantity N, respectively. For example, the UE 115 may use the transmit chain 510-*a* and the transmit chain 510-*b* in a transmit/receive group 520-*a* for uplink communications, and may use the receive chain 515-*c* and the receive chain 515-*d* in a transmit/receive group 520-*b* for downlink communications.

Respective differences between the quantities M and $M_1$ and the quantities N and $N_1$ in slots reserved for full-duplex communications may depend on a capability of the UE 115. For example, the quantities $M_1$ and $N_1$ may depend on (or may be based on) the quantities M and N of receive chains 515 and transmit chains 510 in TDD slots, a power class of the UE 115, a separation distance between antennas of the UE 115 (e.g., a three-dimensional distance, a physical distance, which may be based on a distance of $\lambda/2$, where $\lambda$ is a wavelength of radio frequency signals an antenna and/or antenna element is configured to communicate), or an antenna design of the UE 115. For example, if the UE 115 has a TR switching antenna design, $M_1$ and $N_1$ may be smaller (e.g., than the circulator design). This may be due to a relatively smaller quantity of antenna ports available for transmission and reception, respectively, as compared to half-duplex communications. If the UE 115 has a circulator antenna design, $M_1$ and $N_1$ may be relatively larger (e.g., than for the TR switching design). This may be due to a same quantity of antenna ports available for transmission and reception as compared to half-duplex communications.

In some examples, the UE 115 may identify the quantities M and N based on one or more capabilities of the UE 115 (e.g., based on hardware of the UE 115). The UE 115 may transmit a message to a network entity 105 indicating the quantities M and N of receive chains and transmit chains (e.g., or antenna panels) that the UE 115 may use for half-duplex communications (e.g., in uplink or downlink slots). The message may further indicate the quantities $M_1$ and $N_1$ of receive chains and transmit chains (e.g., or antenna panels) that the UE 115 may use for full-duplex communications (e.g., in full-duplex slots, such as SBFD slots). The network entity 105 may accordingly schedule uplink and downlink transmissions in half-duplex slots and in full-duplex slots in accordance with the quantities M and N.

Figure 6:
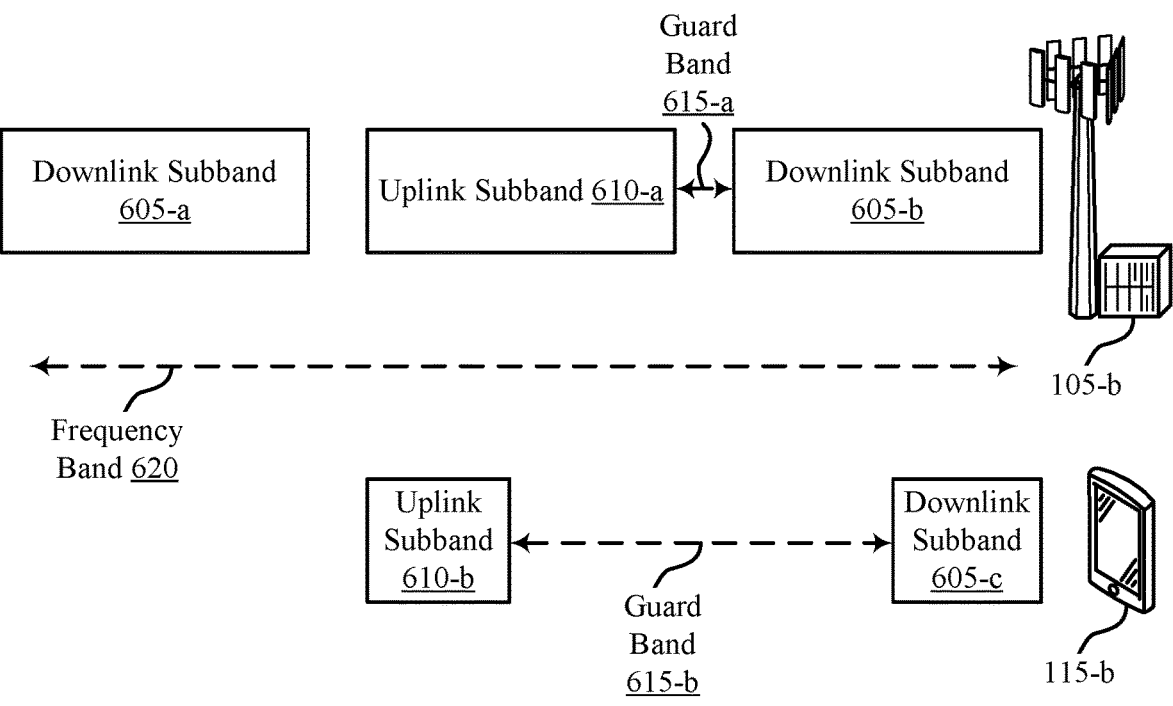
FIG. 6 shows an example of a resource diagram that supports full-duplex operations for UEs in accordance with one or more aspects of the present disclosure.

FIG. 6 shows an example of a resource diagram 600 that supports full-duplex operations for UEs in accordance with one or more aspects of the present disclosure. The resource diagram 600 may implement or may be implemented by aspects of the wireless communications system 100, the wireless communications system 200, the circuit diagram 300, the circuit diagram 400, or the circuit diagram 500. For example, the resource diagram 600 may include a UE 115 (e.g., a UE 115-b) and a network entity 105 (e.g., a network entity 105-b), which may be examples of the corresponding devices as described with reference to FIG. 1.

In some examples, a network entity 105-b may communicate with a UE 115-b (e.g., and one or more other UEs 115) via a frequency band 620 using full-duplex communication techniques. For example, the network entity 105-b may transmit downlink signaling via a downlink subband 605-a and a downlink subband 605-b via time resources which overlap (e.g., partially or fully overlap) with time resources reserved for receiving uplink signaling via an uplink subband 610-a. To reduce interference between the downlink signaling and the uplink signaling, a guard band 615-a may be present between the uplink subband 610-a and the downlink subband 605-b (e.g., and a second guard band 615 may be present between the uplink subband 610-a and the downlink subband 605-a).

In some examples, the UE 115-b may communicate with the network entity 105-b via the frequency band 620 using full-duplex communication techniques. For example, the UE 115-b may transmit uplink signaling via an uplink subband 610-b via time resources which overlap (e.g., partially or fully overlap) with time resources reserved for receiving downlink signaling via a downlink subband 605-c. In some examples, the uplink subband 610-b may overlap in frequency with the uplink subband 610-a. The downlink subband 605-c may overlap in frequency with the downlink subband 605-b (e.g., or the downlink subband 605-a). To reduce interference between the downlink signaling and the uplink signaling, the UE 115-b may not expect signaling via a guard band 615-b between the uplink subband 610-a and the downlink subband 605-c when operating in a full-duplex mode.

In some cases (e.g., due to a relatively smaller separation distance between antenna panels at the UE 115-b as compared to antenna panels at the network entity 105-b), the guard band 615-b may be larger than the guard band 615-a. That is, a gap between the uplink subband 610-b and the downlink subband 605-c may be larger than a gap between the uplink subband 610-a and the downlink subband 605-b. Further, in some cases, a size of the guard band 615-b may not be fixed. That is, the size of the guard band 615-b which may reduce interference between the uplink signaling and the downlink signaling may be based on a transmission power or beams used by the UE 115-b and/or a priority of the uplink signaling and the downlink signaling (e.g., to achieve a threshold signal quality such as a signal-to-noise ratio (SNR) or a signal-to-noise-plus-interference ratio (SNIR)). For example, if the UE 115-b uses a relatively large transmission power, the size of the guard band 615-b may be relatively larger than for a smaller transmission power. If the UE 115-b operates in some radio frequency bands (e.g., radio frequency bands associated with FR3), beam isolation (e.g., an amount of interference associated with a given transmit beam and a given receive beam) may depend on an antenna design. For example, if the UE 115-b operates in FR3 below 12 GHz, the UE 115-b may have a discrete antenna design (e.g., similar to FR1 designs). If the UE 115-b operates in FR3 above 12 GHz, the UE 115-b may have either a discrete antenna design or a modular antenna design. Thus, the size of the guard band 615-a may further depend on the antenna design of the UE 115-b.

In some implementations, the UE 115-b may characterize (e.g., measure) interference to determine the size of the guard band 615-b. For example, the UE 115-b may characterize an amount of SI incurred by the UE 115-b and may determine a default guard band size based on the SI. The UE 115-b may, additionally, or alternatively, measure an amount of clutter (e.g., interference caused by signaling reflected from obstacles) to dynamically determine the size of the guard band 615-b. In some aspects, the UE 115-b may report the size of the guard band 615-b to the network entity 105-b.

In some examples, the UE 115-b may operate in FR3 with a carrier aggregation (CA) (e.g., with multiple CCs in a single data channel). In some aspects, if the UE 115-b uses multiple operators in full-duplex communications, the UE 115-b may reverse downlink subbands 605 and uplink subbands 610 to reduce interference between operators.

To further reduce the interference between the uplink signaling and the downlink signaling, the UE 115-b may identify a configuration of fixed CCs or fixed subbands within one or more CCs, which may be reserved for uplink signaling (e.g., and not other types of signaling). In some examples, the configuration of fixed CCs or fixed subbands within one or more CCs may indicate to the UE 115-b a predetermined range of frequencies over which the UE 115-b may transmit uplink signaling (e.g., and may not expect to receive downlink signaling). Here, a "fixed CC" may refer to one or more CCs that are predefined, preconfigured, unchanging, having some predefined index, and/or that are defined by some set of parameters such that each of the one or more fixed CCs are expected to be located (e.g., in the frequency domain) at some particular location (e.g., at some tone (e.g., one or more frequency resources, such as one or more subcarriers, resource blocks (RBs), resource elements (REs), or the like), at some band, at some resource location, at some index, or the like) for communications (e.g., uplink communications). Similarly, a "fixed subband" may refer to one or more subbands that are predefined, preconfigured, unchanging, and/or that are defined by some set of parameters such that each of the one or more fixed subbands are expected to be located (e.g., in the frequency domain) at some particular location (e.g., at some tone, at some band, at some resource location, at some index, or the like) for communications. In some aspects, a "fixed CC" and a "fixed subband" may be defined by (or have one or more parameters that are defined by) some wireless communication standard. A non-fixed subband or CC may be, for example, a subband or CC which is not specifically defined for a particular type of communication (or have one or more parameters that are defined by) some wireless communications standard. Put another way, while other subbands or CCs may be used in a wireless communications system, non-fixed subbands or CCs may be associated with some predetermined function or parameters, for example, for a particular communication direction (e.g., uplink communications in full-duplex systems). That is, a non-fixed subband or CC may be a subband or CC determined by a wireless device (e.g., the UE 115-*b*) without receiving an indication of a set of parameters such that each of the one or more non-fixed subbands or CCs are expected to be located (e.g., in the frequency domain) at some particular location (e.g., at some tone, at some band, at some resource location, at some index, or the like) for a particular type of communications. Such non-fixed subbands or CCs may not be predefined, preconfigured, and/or unchanging.

In some examples, the configuration may indicate, to the UE 115-*b*, the range of frequencies as one or more central frequencies and one or more bandwidths over which the UE 115-*b* may transmit uplink signaling. In some examples, the configuration may indicate the range of frequencies to the UE 115-*b* as a starting resource block (RB) and a length (e.g., a quantity) of RBs. The UE 115-*b* may further identify a guard band between the fixed uplink CCs or subbands and one or more CCs or subbands reserved for downlink signaling. Such techniques are described in further detail with reference to FIG. 7.

Figure 7:
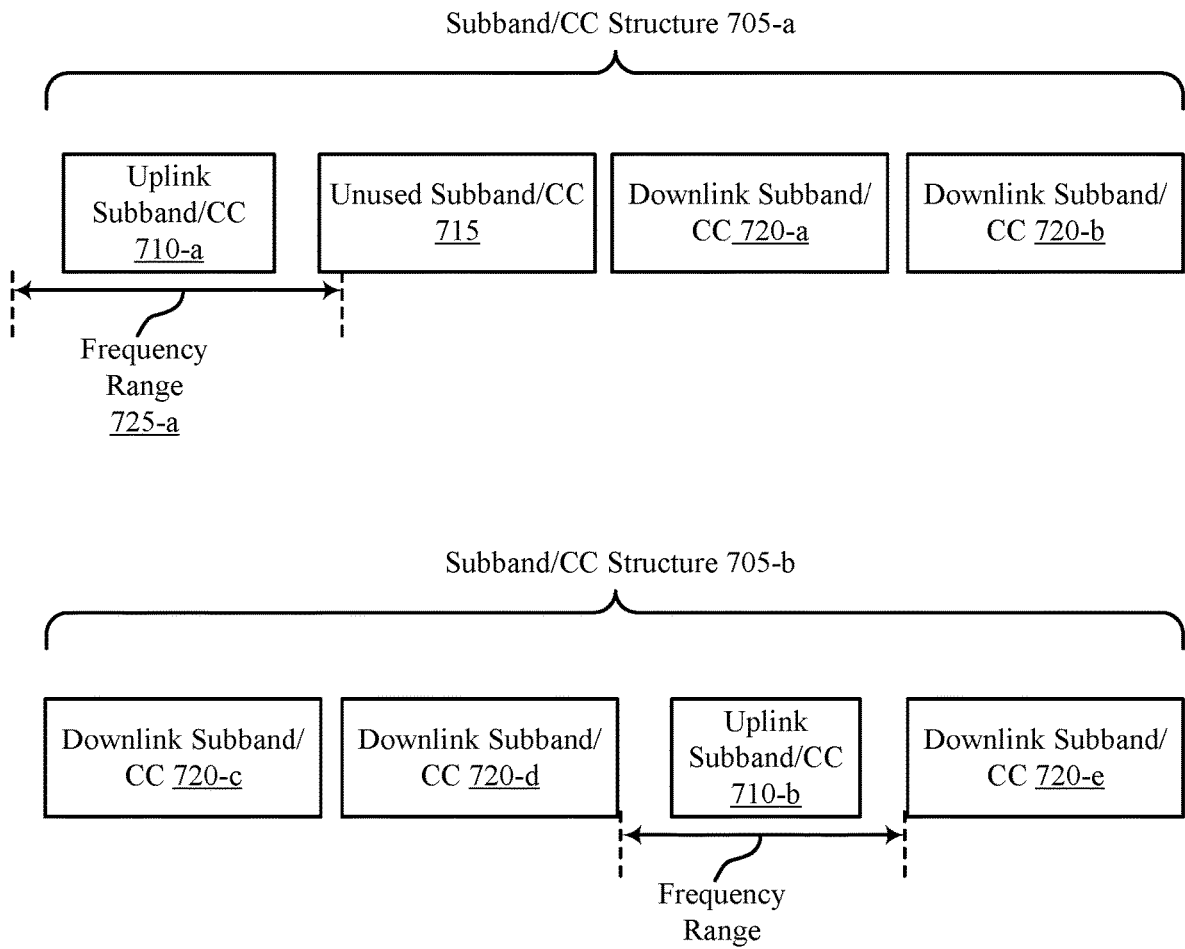
FIG. 7 shows an example of a resource diagram that supports full-duplex operations for UEs in accordance with one or more aspects of the present disclosure.

FIG. 7 shows an example of a resource diagram 700 that supports full-duplex operations for UEs in accordance with one or more aspects of the present disclosure. The resource diagram 700 may implement or may be implemented by aspects of the wireless communications system 100, the wireless communications system 200, the circuit diagram 300, the circuit diagram 400, the circuit diagram 500, or the resource diagram 600. For example, the resource diagram 700 may include a UE 115 and a network entity 105, which may be examples of the corresponding devices as described with reference to FIG. 1.

In some examples, a UE 115 operating in a full-duplex operation mode may use one or more duplexers (e.g., filters between downlink frequency subbands and uplink frequency subbands) to reduce interference between downlink signaling and uplink signaling. As an illustrative example, a UE 115 operating in FR1 using a full-duplex operation mode may use a subband duplexer in the RF front-end (RFFE) of the UE 115. The subband RFFE duplexer may, for example, filter uplink signaling and downlink signaling outside of a 25 MHz uplink subband and a 25 MHz downlink subband in a 100 MHz occupied bandwidth (OBW). However, in some examples, the duplexer may result in non-linear interference caused by signal leakage outside of the uplink subband and the downlink subband. The signal leakage may further cause a degradation of sensitivity (e.g., desense) of one or more receivers of the UE 115, which may further decrease a quality of communications. Thus, the UE 115 may use a guard band between the uplink subband and the downlink subband to mitigate the non-linear interference and desense, and the UE 115 may therefore use fixed locations of uplink subbands or CCs for a duplexer antenna design.

The UE 115 may operate in a full-duplex operation mode (e.g., SBFD, IBFD) using subbands within a CC or across respective CC. For example, (e.g., for relatively lower frequency bands such as FR1), the UE 115 may use one or more defined uplink subbands and one or more defined downlink subbands within a CC for full-duplex communications. In some examples (e.g., for relatively higher frequency bands such as FR3), the UE 115 may use one or more defined uplink CCs and one or more defined downlink CCs for full-duplex communications. A portion of one or more CCs that the UE 115 uses for uplink or downlink communications (e.g., a usable part of a carrier) may be defined by a quantity of RBs.

In some implementations, the UE 115 may identify one or more configurations for the defined (e.g., fixed) uplink subband/CC 710 (e.g., or the downlink subbands/CCs 720), for example, as a rule defined in a specification. Here, the uplink subband/CC 710 may represent a respective subband within a CC (e.g., when using the respective subbands for full-duplex communications) or the uplink subband/CC 710 may represent a respective CC (e.g., when using different CCs for full-duplex communications). As described herein, a fixed uplink subband/CC 710 may be defined as a range of frequencies over which the UE 115 may transmit uplink signaling (e.g., and may not expect to transmit downlink signaling). That is, while operating in a full-duplex operation mode, the UE 115 may reserve the one or more fixed uplink subbands/CCs 710 for uplink transmissions.

The one or more configurations for the fixed uplink subband/CC 710 may define the range of frequencies over which the UE 115 may transmit uplink signaling. In some examples, the rule may define the one or more fixed uplink subbands/CCs 710 to the UE 115 as a central frequency (e.g., a preconfigured central frequency, a predefined central frequency) and a bandwidth (e.g., a preconfigured bandwidth, a preconfigured bandwidth). The rule may define a fixed uplink subband within a CC to the UE 115 as a starting RB and a length (e.g., a quantity, a preconfigured quantity, a predefined quantity) of RBs for a given sub-carrier spacing (SCS). In some aspects, the UE 115 may not expect to transmit uplink signaling via the downlink subbands/CCs 720. Likewise, the UE 115 may not expect to receive downlink signaling via the fixed uplink subbands/CCs 710. In some examples, the UE 115 may identify configurations for two or more candidate fixed uplink subbands/CCs 710, and may select one or more of the candidate uplink subbands/CCs 710 based on a capability of the UE 115 (a transmit power, an antenna design, a duplexer, etc.).

In some implementations, the UE 115 may identify one or more configurations for guard bands between the uplink subbands/CCs 710 and the downlink subbands/CCs 720. For example, the one or more configurations may be a rule defined in a specification. In some examples, the UE 115 may determine the one or more configurations (e.g., based on a measured SI or clutter) and may indicate the one or more configurations to a network entity 105 via a UE capability message (e.g., a capability message for each CC for a UE 115 operating based on feature set per carrier (FSPC)). For example, the UE 115 may determine the one or more configurations based on a guard band size, which may reduce non-linear interference and desense incurred by the duplexer (e.g., to below a threshold noise level).

As an illustrative example, a configuration of uplink subbands/CCs 710-*a* may indicate a subband/CC structure 705 such as a subband/CC structure 705-*a*. That is, the configuration of uplink subbands/CCs 710 may indicate for the UE 115 to transmit uplink signaling via a first uplink subband/CC 710-*a* and for the UE 115 to receive downlink signaling via a third downlink subband/CC 720-*a* and a fourth downlink subband/CC 720-*b*. In some examples, the UE 115 may determine that the uplink signaling may result in signal leakage across a frequency range 725-*a*, and may thus refrain from receiving downlink signaling via an unused subband/CC 715 that overlaps in frequency with the frequency range 725-*a*. That is, the UE 115 may not expect to receive downlink signaling via the unused subband/CC 715 overlapping in the frequency domain with the frequency range 725-*a*. In such cases, the fixed uplink subband/CC 710-*a*, and one or more guard bands between the subband/CC 710-*a* and other subbands/CCs, may be included in the frequency range 725-*a*, and the UE may not expect to receive downlink signaling in the other subbands that at least partially overlap with the frequency range 725-*a*. That is, if an adjacent subband/CC overlaps with the frequency range 725-*a*, that adjacent subband/CC may be an unused subband/CC 715 (e.g., not used for uplink or downlink signaling).

As an additional illustrative example, the configuration of uplink subbands/CCs 710 may indicate a subband/CC structure 705-*b*. That is, the configuration of uplink subbands/CCs 710 may indicate for the UE 115 to transmit uplink signaling via a third uplink subband/CC 710-*b* and for the UE 115 to receive downlink signaling via a first downlink subband/CC 720-*c*, a second downlink subband/CC 720-*d*, and a third downlink subband/CC 720-*e*. In some examples, the UE 115 may determine that the uplink signaling may not result in signal leakage across a frequency range 725-*b* that may not overlap in frequency with the downlink subband/CC 720-*d* and the downlink subband/CC 720-*e* (e.g., the other downlink subbands/CCs may be at least at a boundary of the frequency range 725-*b*, and may not be interfered with by the uplink signaling from the UE 115). The UE 115 may accordingly expect to receive downlink signaling via the downlink subband/CC 720-*d* and the downlink subband/CC 720-*e*.

Figure 8:
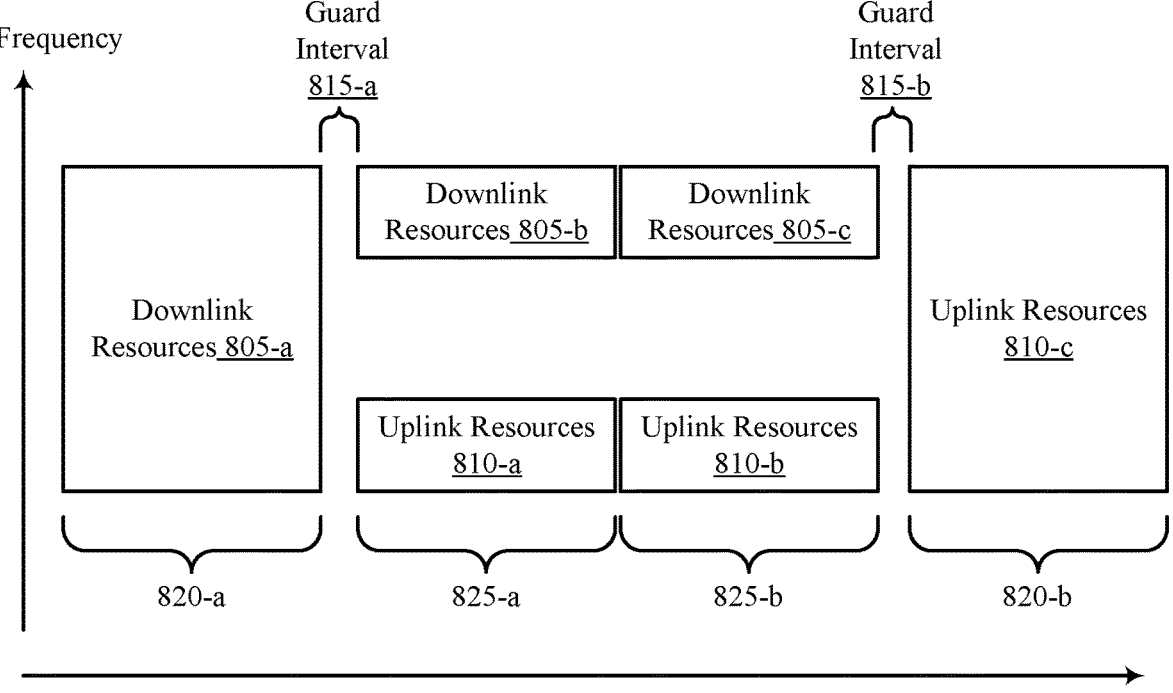
FIG. 8 shows an example of a resource diagram that supports full-duplex operations for UEs in accordance with one or more aspects of the present disclosure.

FIG. 8 shows an example of a resource diagram 800 that supports full-duplex operations for UEs in accordance with one or more aspects of the present disclosure. The resource diagram 800 may implement or may be implemented by aspects of the wireless communications system 100, the wireless communications system 200, the circuit diagram 300, the circuit diagram 400, the circuit diagram 500, the resource diagram 600, or the resource diagram 700. For example, the resource diagram 800 may include a UE 115 and a network entity 105, which may be examples of the corresponding devices as described with reference to FIG. 1.

In some implementations, a UE 115 may communicate with a network entity 105 using half-duplex communication resources and full-duplex (e.g., SBFD, IBFD) communication resources. For example, the UE 115 may communicate using half-duplex communication techniques via downlink resources 805-*a* and via uplink resources 810-*a* (e.g., which may not overlap in time). The UE 115 may communicate using full-duplex communication techniques via full-duplex resources (e.g., downlink resources 805-*b*, downlink resources 805-*c*, uplink resources 810-*a*, and uplink resources 810-*b*), which may at least partially overlap in time or frequency, or both.

In some examples, the UE 115 may bypass one or more filters of the UE 115 while communicating via the downlink resources 805-*a* (e.g., via a half-duplex slot 820-*a*). The UE 115 may use one or more different filters, antennas, and the like when communicating via the full-duplex resources (e.g., via full-duplex slots 825-*a* and 825-*b*) and the uplink resources 810-*c* (e.g., via a half-duplex slot 820-*b*). Accordingly, the UE 115 may spend an amount of time (e.g., a switching delay) changing or switching filters between the downlink resources 805-*a*, the full-duplex resources, and the uplink resources 810-*c*.

Accordingly, the UE 115 may identify a configuration for a guard interval 815-*a* and a guard interval 815-*b* between the downlink resources 805-*a*, the full-duplex resources, and the uplink resources 810-*c* to allow for the UE 115 to switch between half-duplex communication resources and full-duplex communication resources. The UE 115 may refrain from transmitting or receiving signaling during the guard interval 815-*a* and the guard interval 815-*b*.

In some examples, the UE 115 may identify the guard interval 815-*a* and the guard interval 815-*b* as a rule defined in a specification. For example, the rule may define a quantity of symbols (e.g., guard symbols) or a transient time period (T_P) defined in absolute time between half-duplex resources and full-duplex resources during which the UE 115 may refrain from transmitting or receiving signaling. In some examples, the UE 115 may identify the guard interval 815-*a* and the guard interval 815-*b* based on a capability of the UE 115. For example, the guard interval 815-*a* and the guard interval 815-*b* may be a transient time period or a quantity of symbols based on a quantity or switching speed of filters, antennas, and the like of the UE 115.

Figure 9:
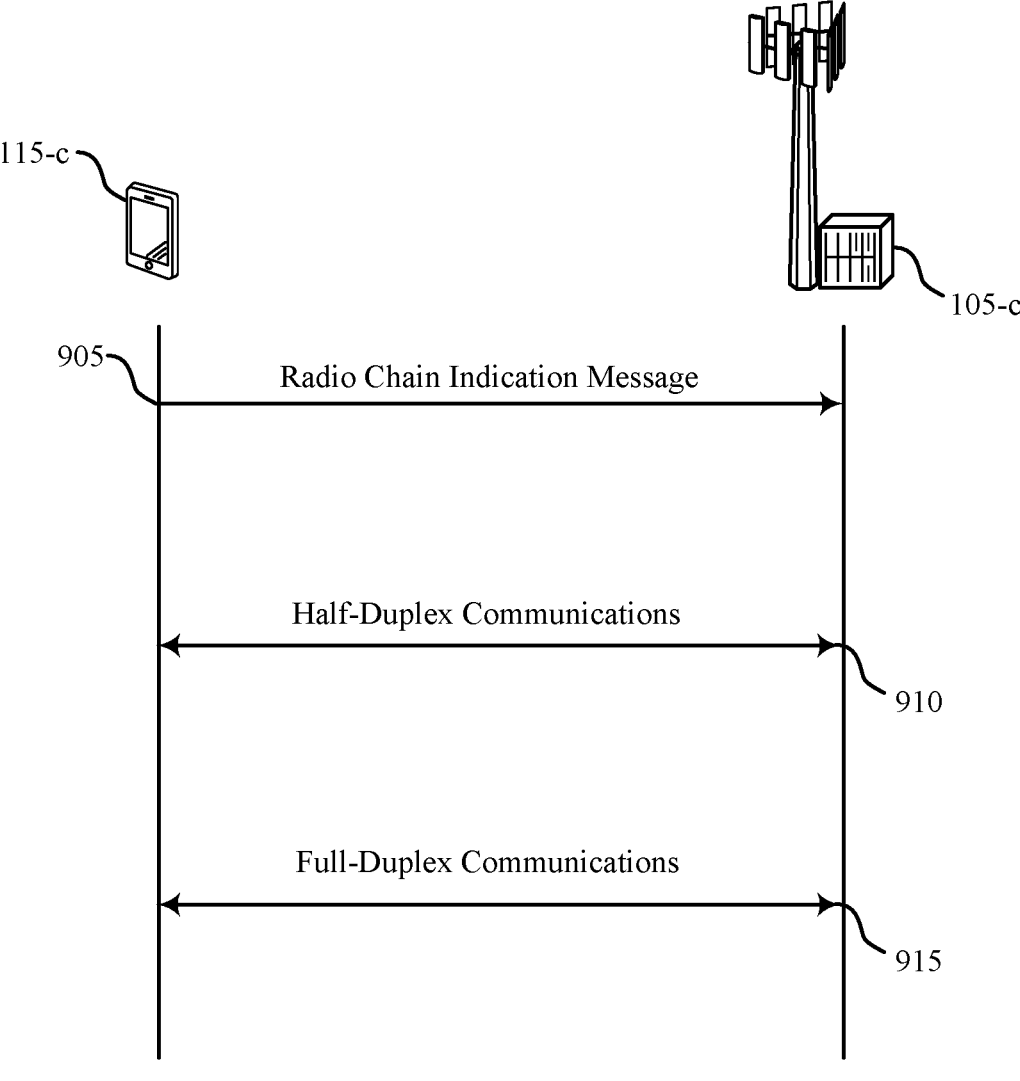
FIG. 9 shows an example of a process flow that supports full-duplex operations for UEs in accordance with one or more aspects of the present disclosure.

FIG. 9 shows an example of a process flow 900 that supports full-duplex operations for UEs in accordance with one or more aspects of the present disclosure. The process flow 900 may implement or may be implemented by aspects of the wireless communications system 100, the wireless communications system 200, the circuit diagram 300, the circuit diagram 400, the circuit diagram 500, the resource diagram 600, the resource diagram 700, or the resource diagram 800. For example, the process flow 900 may include a UE 115 (e.g., a UE 115-*c*) and a network entity 105 (e.g., a network entity 105-*c*), which may be examples of the corresponding devices as described with reference to FIG. 1.

In the following description of the process flow 900, the operations between the UE 115-*c* and the network entity 105-*c* may be transmitted in a different order than the example order shown. Some operations may also be omitted from the process flow 900, and other operations may be added to the process flow 900. Further, although some operations or signaling may be shown to occur at different times for discussion purposes, these operations may actually occur at the same time.

At 905, the UE 115-*c* may transmit a message to the network entity 105-*c* indicating quantities of radio chains of the UE 115-*c*. For example, the message may indicate a first set of transmit chains and a second set of receive chains which the UE 115-*c* may use in a half-duplex communication mode. The message may further indicate a third set of transmit chains and a fourth set of receive chains which the UE 115-*c* may use in a full-duplex (e.g., SBFD, IBFD) communication mode. In some examples, respective quantities of radio chains in the third and fourth sets may be less than respective quantities of radio chains in the first and second sets. For example, the third and fourth sets may be subsets of the first and second sets, respectively. In some examples, the UE 115-*c* may transmit the message via a physical uplink shared channel (PUSCH) or a physical uplink control channel (PUCCH).

In some examples, the respective quantities of radio chains in the third and fourth sets may be based on one or more capabilities of the UE 115-c. For example, the respective quantities of radio chains in the third and fourth sets may be based on one or more of a quantity of radio chains used for TDD (e.g., the respective quantities of radio chains in the first and second sets), a power class of the UE 115-c, a distance between antenna elements of the UE 115-c (e.g., a physical separation between antenna elements), an antenna configuration of the UE 115-c, and one or more antenna components of the UE 115-c.

At 910, the UE 115-c may communicate with the network entity 105-c using the half-duplex communication mode. That is, the UE 115-c may transmit uplink signaling to the network entity 105-c by using the first set of transmit chains and via first resources (e.g., resource elements, resource blocks, time/frequency resources) and receive downlink signaling from the network entity 105-c by using the second set of receive chains and via second resources (e.g., resource elements, resource blocks, time/frequency resources) which may not overlap in time with the first resources.

At 915, the UE 115-c may communicate with the network entity 105-c using the full-duplex communication mode. That is, the UE 115-c may transmit uplink signaling to the network entity 105-c by using the third set of transmit chains and via third resources (e.g., resource elements, resource blocks, time/frequency resources) and receive downlink signaling from the network entity 105-c by using the fourth set of receive chains and via fourth resources (e.g., resource elements, resource blocks, time/frequency resources) which may overlap in time with the third resources.

Figure 10:
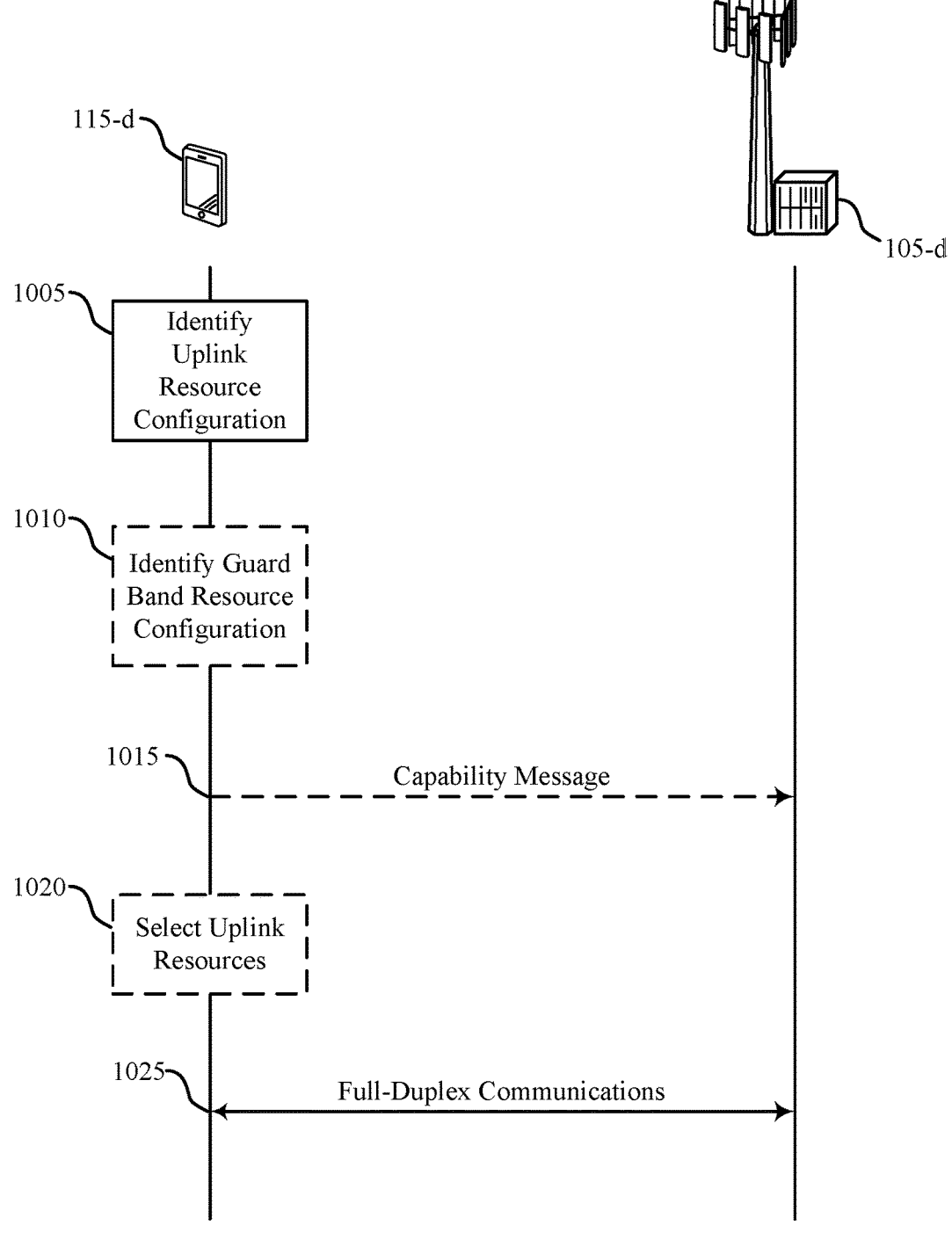
FIG. 10 shows an example of a process flow that supports full-duplex operations for UEs in accordance with one or more aspects of the present disclosure.

FIG. 10 shows an example of a process flow 1000 that supports full-duplex operations for UEs in accordance with one or more aspects of the present disclosure. The process flow 1000 may implement or may be implemented by aspects of the wireless communications system 100, the wireless communications system 200, the circuit diagram 300, the circuit diagram 400, the circuit diagram 500, the resource diagram 600, the resource diagram 700, the resource diagram 800, or the process flow 900. For example, the process flow 1000 may include a UE 115 (e.g., a UE 115-d) and a network entity 105 (e.g., a network entity 105-d), which may be examples of the corresponding devices as described with reference to FIG. 1.

In the following description of the process flow 1000, the operations between the UE 115-d and the network entity 105-d may be transmitted in a different order than the example order shown. Some operations may also be omitted from the process flow 1000, and other operations may be added to the process flow 1000. Further, although some operations or signaling may be shown to occur at different times for discussion purposes, these operations may actually occur at the same time.

At 1005, the UE 115-d may identify a configuration of uplink resources for use in a full-duplex (e.g., SBFD, IBFD) communication mode at the UE 115-d. The configuration of uplink resources may indicate one or more fixed CCs or one or more subbands within a CC which may be used by the UE 115-d to transmit uplink signaling. In some examples, the UE 115-d may be configured (e.g., preconfigured) with the configuration of uplink resources. In some examples, the configuration of uplink resources may indicate one or more preconfigured central frequencies and preconfigured bandwidths of the one or more fixed CCs or subbands. In some examples, the configuration of uplink resources may indicate one or more starting RBs and preconfigured lengths (e.g., quantities) of RBs of the one or more fixed subbands.

In some examples, at 1010, the UE 115-d may identify a configuration of guard bands for use in the full-duplex communication mode. The configuration of guard bands may indicate a size of a first guard band (e.g., a frequency range or a length of RBs) between the one or more fixed CCs or fixed subbands for uplink signaling and one or more other CCs or subbands reserved for receiving downlink signaling from the network entity 105-d. In some examples, the UE 115-d may select the configuration of guard bands from a set of preconfigured configurations of guard bands.

In some examples, at 1015, the UE 115-d may transmit a capability message to the network entity 105-d. The capability message may include an indication of the configuration of guard bands. In some examples, the configuration of guard bands and/or the configuration of uplink resources may be based on one or more capabilities of the UE 115-d. For example, the one or more capabilities may include an antenna configuration, a transmit power, a power class, a transmission priority, one or more SI or clutter measurements, or a duplexer of the UE 115-d. The UE 115-d may transmit the capability message via a PUCCH or a PUSCH.

In some examples, at 1020, the UE 115-d may select a first fixed CC or a first fixed subband within a CC from the one or more fixed CCs or subbands for uplink transmissions in the full-duplex communication mode by the UE 115-d. For example, the UE 115-d may select the first fixed CC or the first fixed subband based on one or more capabilities of the UE 115-d. For example, the one or more capabilities may include an antenna configuration, a transmit power, a power class, a transmission priority, one or more SI or clutter measurements, or a duplexer of the UE 115-d.

At 1025, the UE 115-d may communicate with the network entity 105-d using the full-duplex communication mode. For example, the UE 115-d may transmit uplink signaling via the one or more fixed subbands or CCs (e.g., the first fixed subband or the first fixed CC) and receive downlink signaling via the one or more other subbands or CCs. In some examples, the downlink signaling may be an example of or include one or more downlink messages, such as a downlink control message, a downlink data message, one or more reference signals, or the like. The uplink signaling may be an example of or include one or more uplink messages, such as an uplink control message, an uplink data message, one or more reference signals, or the like. In some examples, the UE 115-d may transmit the uplink signaling via first resources and receive the downlink signaling via second resources which may be in a same time interval as the first resources. As a result, the uplink signaling and the downlink signaling may at least partially overlap (e.g., respective time/frequency resources used for the uplink signaling and downlink signaling may at least partially overlap) such that the UE 115-d simultaneously receives at least a portion of the downlink signaling while transmitting the uplink signaling (e.g., in accordance with full-duplex communications). The UE 115-d may refrain from transmitting uplink signaling via the one or more guard bands and the one or more other CCs or subbands. The UE 115-d may refrain from receiving downlink signaling via the one or more guard bands and the one or more fixed CCs or subbands.

Figure 11:
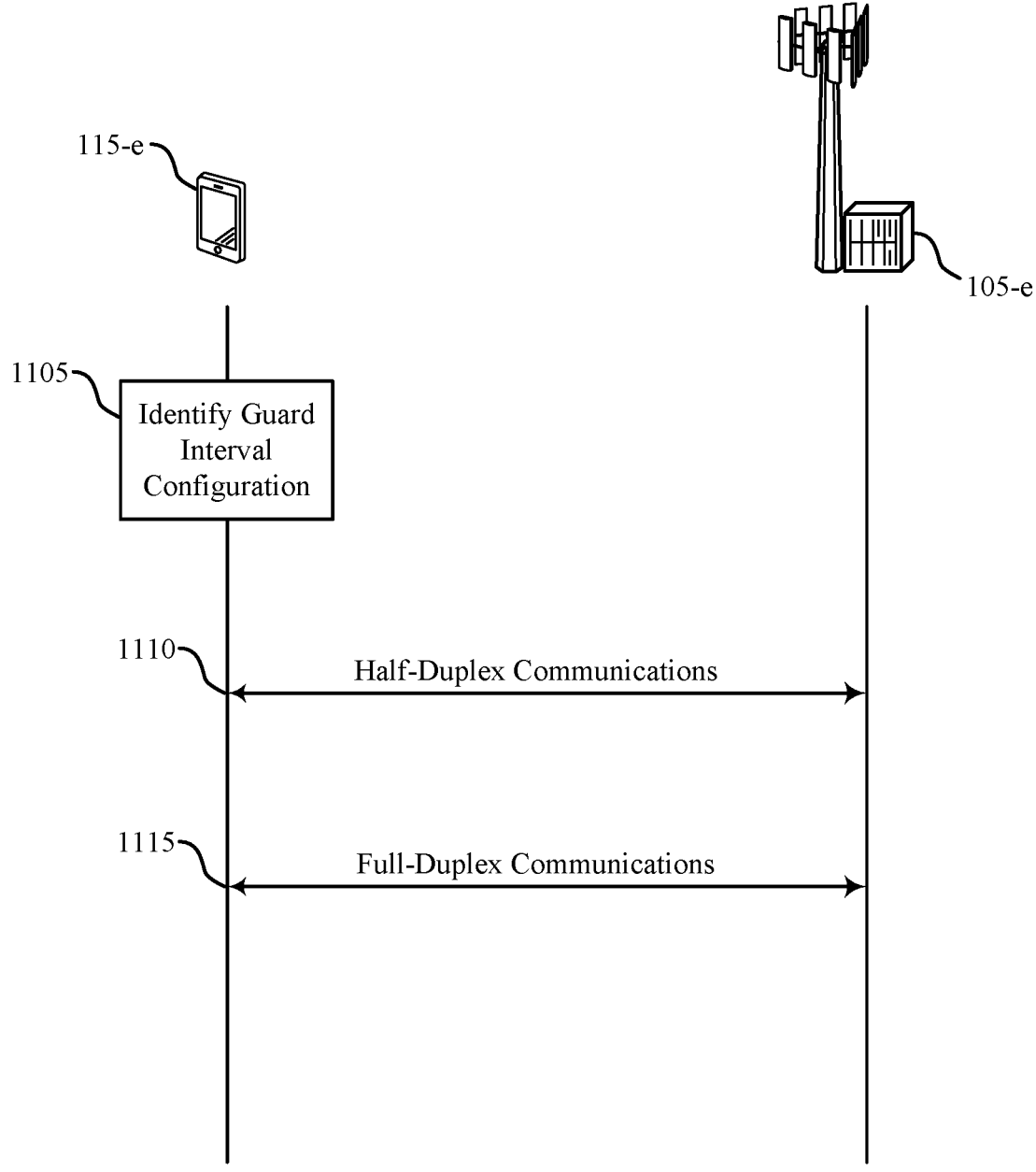
FIG. 11 shows an example of a process flow that supports full-duplex operations for UEs in accordance with one or more aspects of the present disclosure.

FIG. 11 shows an example of a process flow 1100 that supports full-duplex operations for UEs in accordance with one or more aspects of the present disclosure. The process flow 1100 may implement or may be implemented by aspects of the wireless communications system 100, the wireless communications system 200, the circuit diagram 300, the circuit diagram 400, the circuit diagram 500, the resource diagram 600, the resource diagram 700, the resource diagram 800, the process flow 900, or the process flow 1000. For example, the process flow 1100 may include a UE 115 (e.g., a UE 115-*e*) and a network entity 105 (e.g., a network entity 105-*e*), which may be examples of the corresponding devices as described with reference to FIG. 1.

In the following description of the process flow 1100, the operations between the UE 115-*e* and the network entity 105-*e* may be transmitted in a different order than the example order shown. Some operations may also be omitted from the process flow 1100, and other operations may be added to the process flow 1100. Further, although some operations or signaling may be shown to occur at different times for discussion purposes, these operations may actually occur at the same time.

At 1105, the UE 115-*e* may identify a configuration for a guard interval for switching between half-duplex communication resources and full-duplex (e.g., SBFD, IIBFD) communication resources. The guard interval may be based on a capability of the UE 115-*e* to operate using a full-duplex communication mode. In some examples, the UE 115-*d* may identify the guard interval based on one or more preconfigured quantities of symbols or one or more preconfigured transient time periods (e.g., defined in absolute time) associated with switching between the half-duplex communication resources and the full-duplex communication resources. In some examples, the UE 115-*d* may identify the guard interval as a quantity of symbols or a transient time period based on one or more capabilities of the UE 115-*d*. The one or more capabilities of the UE 115-*d* may include an antenna configuration or a filter configuration of the UE 115-*d*.

At 1110, the UE 115-*e* may communicate with the network entity 105-*e* via the half-duplex communication resources. For example, the UE 115-*e* may transmit uplink signaling via first resources and may receive downlink signaling via second resources which may not overlap in time with the first resources.

At 1115, the UE 115-*e* may communicate with the network entity 105-*e* via the full-duplex communication resources. For example, the UE 115-*e* may transmit uplink signaling via third resources and may receive downlink signaling via fourth resources which may overlap in time with the third resources. In some examples, the UE 115-*e* may communicate with the network entity 105-*e* in accordance with the guard interval. That is, the UE 115-*e* may switch between the half-duplex resources and the full-duplex resources during the guard interval. The UE 115-*e* may refrain from transmitting or receiving signaling during the guard interval.

Figure 12:
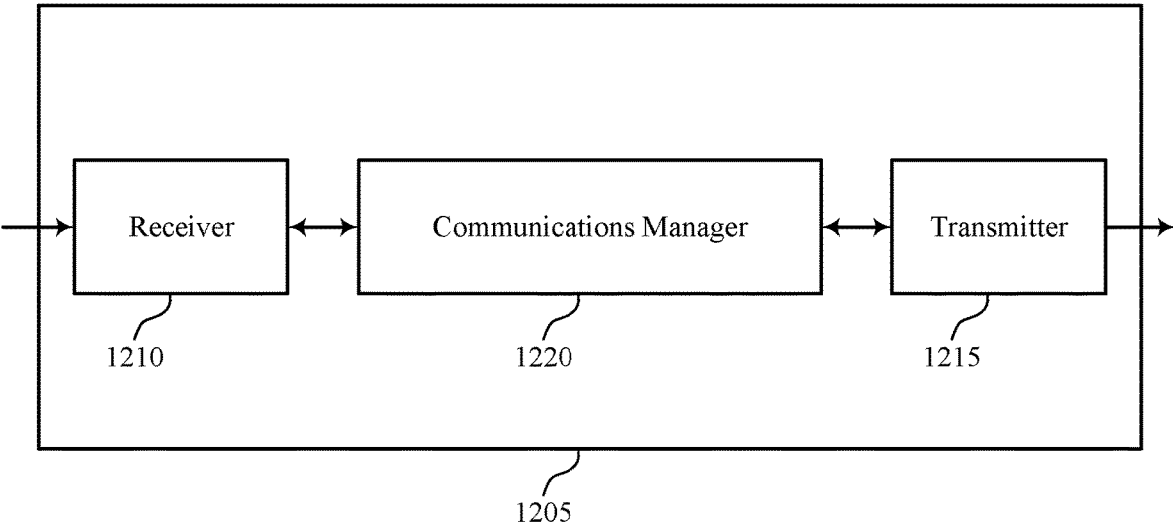
FIGS. 12 and 13 show block diagrams of devices that support full-duplex operations for UEs in accordance with one or more aspects of the present disclosure.

FIG. 12 shows a block diagram 1200 of a device 1205 that supports full-duplex operations for UEs in accordance with one or more aspects of the present disclosure. The device 1205 may be an example of aspects of a UE 115 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory storing processor-executable code, to, individually or collectively, support or enable the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to full-duplex operations for UEs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to full-duplex operations for UEs). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of full-duplex operations for UEs as described herein. For example, the communications manager 1220, the receiver 1210, the transmitter 1215, or various combinations or components thereof may be capable of performing one or more of the functions described herein.

In some examples, the communications manager 1220, the receiver 1210, the transmitter 1215, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1220, the receiver 1210, the transmitter 1215, or various combinations or components thereof may be implemented in code (e.g., as communications management software or firmware) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. For example, the communications manager 1220 is capable of, configured to, or operable to support a means for transmitting, to a network entity, a message indicating a first quantity and a second quantity of radio chains of the UE that are available for (e.g., that the UE may use for) communications in accordance with a half-duplex communication mode and a full-duplex communication mode, respectively. The communications manager 1220 is capable of, configured to, or operable to support a means for communicating with the network entity using the half-duplex communication mode in accordance with the first quantity of radio chains. The communications manager 1220 is capable of, configured to, or operable to support a means for communicating with the network entity using the full-duplex communication mode in accordance with the second quantity of radio chains.

Additionally, or alternatively, the communications manager 1220 may support wireless communications at a UE in accordance with examples as disclosed herein. For example, the communications manager 1220 is capable of, configured to, or operable to support a means for identifying a configuration of one or more fixed CCs or one or more fixed subbands within a CC that are reserved for uplink transmissions by the UE, where the uplink transmissions are associated with the UE operating using a full-duplex communication mode. The communications manager 1220 is capable of, configured to, or operable to support a means for transmitting, via the one or more fixed CCs or the one or more fixed subbands within the CC and while simultaneously receiving at least a portion of one or more downlink messages, one or more uplink messages based on operating using the full-duplex communication mode and in accordance with the configuration.

Additionally, or alternatively, the communications manager 1220 may support wireless communications at a UE in accordance with examples as disclosed herein. For example, the communications manager 1220 is capable of, configured to, or operable to support a means for identifying a configuration for a guard interval associated with switching between half-duplex communication resources and full-duplex communication resources, where the guard interval is based on a capability of the UE to operate using a full-duplex communication mode. The communications manager 1220 is capable of, configured to, or operable to support a means for communicating with a network entity via the half-duplex communication resources and the full-duplex communication resources in accordance with the guard interval between the half-duplex communication resources and the full-duplex communication resources.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for a UE to report radio chain quantities and identify resource and guard interval configurations for full-duplex communications at the UE, which may allow for more efficient utilization of communication resources.

Figure 13:
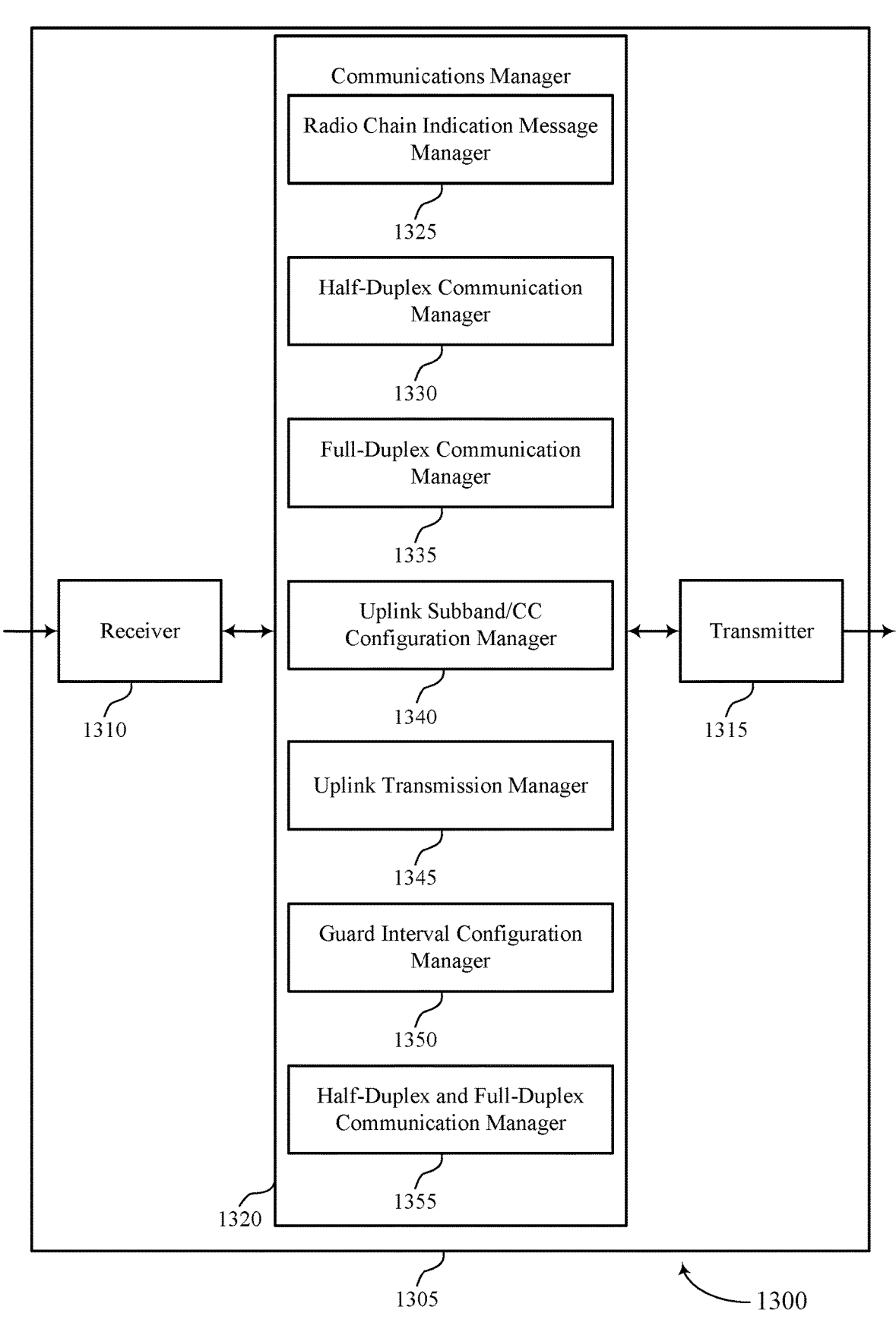

FIG. 13 shows a block diagram 1300 of a device 1305 that supports full-duplex operations for UEs in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to full-duplex operations for UEs). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to full-duplex operations for UEs). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of full-duplex operations for UEs as described herein. For example, the communications manager 1320 may include a radio chain indication message manager 1325, a half-duplex communication manager 1330, a full-duplex communication manager 1335, an uplink subband/CC configuration manager 1340, an uplink transmission manager 1345, a guard interval configuration manager 1350, a half-duplex and full-duplex communication manager 1355, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a UE in accordance with examples as disclosed herein. The radio chain indication message manager 1325 is capable of, configured to, or operable to support a means for transmitting, to a network entity, a message indicating a first quantity and a second quantity of radio chains of the UE that are available for communications in accordance with a half-duplex communication mode and a full-duplex communication mode, respectively. For example, the radio chain indication message manager 1325 is capable of, configured to, or operable to support a means for transmitting the message including an indication of the quantity of (e.g., the number of) RF chains of the UE that are configured for, and which the UE may use for, full-duplex communications, as well as an indication of the quantity of RF chains that are configured for, and which the UE may use for, half-duplex communications. As described herein, the RF chains (and a corresponding quantity thereof) included in the UE and associated with full-duplex communications may be different from the RF chains (and a corresponding quantity thereof) included in the UE and associated with half-duplex communications. As such, the radio chain indication message manager 1325 may indicate the respective quantities of RF chains for full-duplex and half-duplex communications that are available to (e.g., that may be used by) the UE. In some aspects, the quantities of radio chains may be based, at least in part, on one or more identified capabilities of the UE (e.g., corresponding to a build or design of the UE). The half-duplex communication manager 1330 is capable of, configured to, or operable to support a means for communicating with the network entity using the half-duplex communication mode in accordance with the first quantity of radio chains. The full-duplex communication manager 1335 is capable of, configured to, or operable to support a means for communicating with the network entity using the full-duplex communication mode in accordance with the second quantity of radio chains.

Additionally, or alternatively, the communications manager 1320 may support wireless communications at a UE in accordance with examples as disclosed herein. The uplink subband/CC configuration manager 1340 is capable of, configured to, or operable to support a means for identifying a configuration of one or more fixed CCs or one or more fixed subbands within a CC that are reserved for uplink transmissions by the UE, where the uplink transmissions are associated with the UE operating using a full-duplex communication mode. The uplink transmission manager 1345 is capable of, configured to, or operable to support a means for transmitting, via the one or more fixed CCs or the one or more fixed subbands within the CC and while simultaneously receiving at least a portion of one or more downlink messages, one or more uplink messages based on operating using the full-duplex communication mode and in accordance with the configuration.

Additionally, or alternatively, the communications manager 1320 may support wireless communications at a UE in accordance with examples as disclosed herein. The guard interval configuration manager 1350 is capable of, configured to, or operable to support a means for identifying a configuration for a guard interval associated with switching between half-duplex communication resources and full-duplex communication resources, where the guard interval is based on a capability of the UE to operate using a full-duplex communication mode. The half-duplex and full-duplex communication manager 1355 is capable of, configured to, or operable to support a means for communicating with a network entity via the half-duplex communication resources and the full-duplex communication resources in accordance with the guard interval between the half-duplex communication resources and the full-duplex communication resources.

FIG. 14 shows a block diagram 1400 of a communications manager 1420 that supports full-duplex operations for UEs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of full-duplex operations for UEs as described herein. For example, the communications manager 1420 may include a radio chain indication message manager 1425, a half-duplex communication manager 1430, a full-duplex communication manager 1435, an uplink subband/CC configuration manager 1440, an uplink transmission manager 1445, a guard interval configuration manager 1450, a half-duplex and full-duplex communication manager 1455, a guard band configuration manager 1460, a CC selection manager 1465, a subband selection manager 1470, a capability message manager 1475, a downlink reception manager 1480, or any combination thereof. Each of these components, or components or subcomponents thereof (e.g., one or more processors, one or more memories), may communicate, directly or indirectly, with one another (e.g., via one or more buses).

The communications manager 1420 may support wireless communications at a UE in accordance with examples as disclosed herein. The radio chain indication message manager 1425 is capable of, configured to, or operable to support a means for transmitting, to a network entity, a message indicating a first quantity and a second quantity of radio chains of the UE that are available (e.g., that the UE may use) for communications in accordance with a half-duplex communication mode and a full-duplex communication mode, respectively. The half-duplex communication manager 1430 is capable of, configured to, or operable to support a means for communicating with the network entity using the half-duplex communication mode in accordance with the first quantity of radio chains. The full-duplex communication manager 1435 is capable of, configured to, or operable to support a means for communicating with the network entity using the full-duplex communication mode in accordance with the second quantity of radio chains.

In some examples, to support transmitting the message indicating the first quantity and the second quantity of radio chains of the UE, the radio chain indication message manager 1425 is capable of, configured to, or operable to support a means for transmitting the message indicating a first set of transmit chains associated with the half-duplex communication mode and a first set of receive chains associated with the half-duplex communication mode, the first quantity of radio chains including a quantity of the first set of transmit chains and a quantity of the first set of receive chains.

In some examples, to support transmitting the message indicating the first quantity and the second quantity of radio chains of the UE, the radio chain indication message manager 1425 is capable of, configured to, or operable to support a means for transmitting the message indicating a second set of transmit chains associated with the full-duplex communication mode and a second set of receive chains associated with the full-duplex communication mode, the second set of transmit chains including a subset of the first set of transmit chains, and the second set of receive chains including a subset of the first set of receive chains, where the second quantity of radio chains includes a quantity of the second set of transmit chains and a quantity of the second set of receive chains.

In some examples, to support communicating with the network entity using the full-duplex communication mode, the full-duplex communication manager 1435 is capable of, configured to, or operable to support a means for transmitting signaling to the network entity using the second set of transmit chains via a first set of resources. In some examples, to support communicating with the network entity using the full-duplex communication mode, the full-duplex communication manager 1435 is capable of, configured to, or operable to support a means for receiving signaling from the network entity using the second set of receive chains via a second set of resources that at least partially overlap in time with the first set of resources.

In some examples, the second quantity of radio chains is based on one or more capabilities of the UE.

In some examples, the one or more capabilities of the UE are based on a quantity of radio chains used for time-division duplexing resources, a power class of the UE, a distance between antenna elements of the UE, an antenna configuration of the UE, one or more antenna components of the UE, or any combination thereof.

Additionally, or alternatively, the communications manager 1420 may support wireless communications at a UE in accordance with examples as disclosed herein. The uplink subband/CC configuration manager 1440 is capable of, configured to, or operable to support a means for identifying a configuration of one or more fixed CCs or one or more fixed subbands within a CC that are reserved for uplink transmissions by the UE, where the uplink transmissions are associated with the UE operating using a full-duplex communication mode. The uplink transmission manager 1445 is capable of, configured to, or operable to support a means for transmitting, via the one or more fixed CCs or the one or more fixed subbands within the CC and while simultaneously receiving at least a portion of one or more downlink messages, one or more uplink messages based on operating using the full-duplex communication mode and in accordance with the configuration.

In some examples, the guard band configuration manager 1460 is capable of, configured to, or operable to support a means for identifying a guard band configuration that indicates a size of a first guard band between each of the one or more fixed CCs and one or more other CCs or a size of a second guard band between each of the one or more fixed subbands and one or more other subbands within the CC, where the one or more other CCs, or the one or more other subbands, or both, are associated with receiving the one or more downlink messages during a same time interval as transmitting the one or more uplink messages.

In some examples, the guard band configuration is identified based on one or more preconfigured guard band configurations.

In some examples, the capability message manager 1475 is capable of, configured to, or operable to support a means for transmitting, to a network entity, a capability message including an indication of the guard band configuration, where the size of the first guard band or the size of the second guard band, or both, is based on one or more capabilities of the UE.

In some examples, the uplink transmission manager 1445 is capable of, configured to, or operable to support a means for refraining from transmitting uplink messages via the one or more other CCs based on the one or more fixed CCs and the size of the first guard band. In some examples, the downlink reception manager 1480 is capable of, configured to, or operable to support a means for refraining from receiving downlink messages via the one or more fixed CCs based on the one or more fixed CCs and the size of the first guard band.

In some examples, the uplink transmission manager 1445 is capable of, configured to, or operable to support a means for refraining from transmitting uplink messages via the one or more other subbands within the CC based on the one or more fixed subbands and the size of the second guard band. In some examples, the downlink reception manager 1480 is capable of, configured to, or operable to support a means for refraining from receiving downlink messages via the one or more fixed subbands based on the one or more fixed subbands and the size of the second guard band.

In some examples, the CC selection manager 1465 is capable of, configured to, or operable to support a means for selecting a first fixed CC from the one or more fixed CCs based on one or more capabilities of the UE, where transmitting the one or more uplink messages includes transmitting the one or more uplink messages via the fixed CC.

In some examples, the subband selection manager 1470 is capable of, configured to, or operable to support a means for selecting a first fixed subband from the one or more fixed subbands based on one or more capabilities of the UE, where transmitting the one or more uplink messages includes transmitting the one or more uplink messages via the first fixed subband.

In some examples, the one or more fixed CCs are each defined by a preconfigured central frequency and a preconfigured bandwidth.

In some examples, the one or more fixed subbands within the CC are each defined by a preconfigured central frequency and a preconfigured bandwidth.

In some examples, the one or more fixed subbands within the CC are each defined by a first RB and a preconfigured quantity of RBs.

Additionally, or alternatively, the communications manager 1420 may support wireless communications at a UE in accordance with examples as disclosed herein. The guard interval configuration manager 1450 is capable of, configured to, or operable to support a means for identifying a configuration for a guard interval associated with switching between half-duplex communication resources and full-duplex communication resources, where the guard interval is based on a capability of the UE to operate using a full-duplex communication mode. The half-duplex and full-duplex communication manager 1455 is capable of, configured to, or operable to support a means for communicating with a network entity via the half-duplex communication resources and the full-duplex communication resources in accordance with the guard interval between the half-duplex communication resources and the full-duplex communication resources.

In some examples, the guard interval includes a quantity of symbols associated with switching between the half-duplex communication resources and the full-duplex communication resources.

In some examples, the configuration of the guard interval is further identified based on one or more preconfigured guard intervals.

In some examples, the quantity of symbols associated with switching between the half-duplex communication resources and the full-duplex communication resources is based on one or more additional capabilities of the UE.

In some examples, the guard interval includes a transient time period associated with switching between the half-duplex communication resources and the full-duplex communication resources. In some examples, the transient time period is defined with regard to an absolute time.

Figure 15:
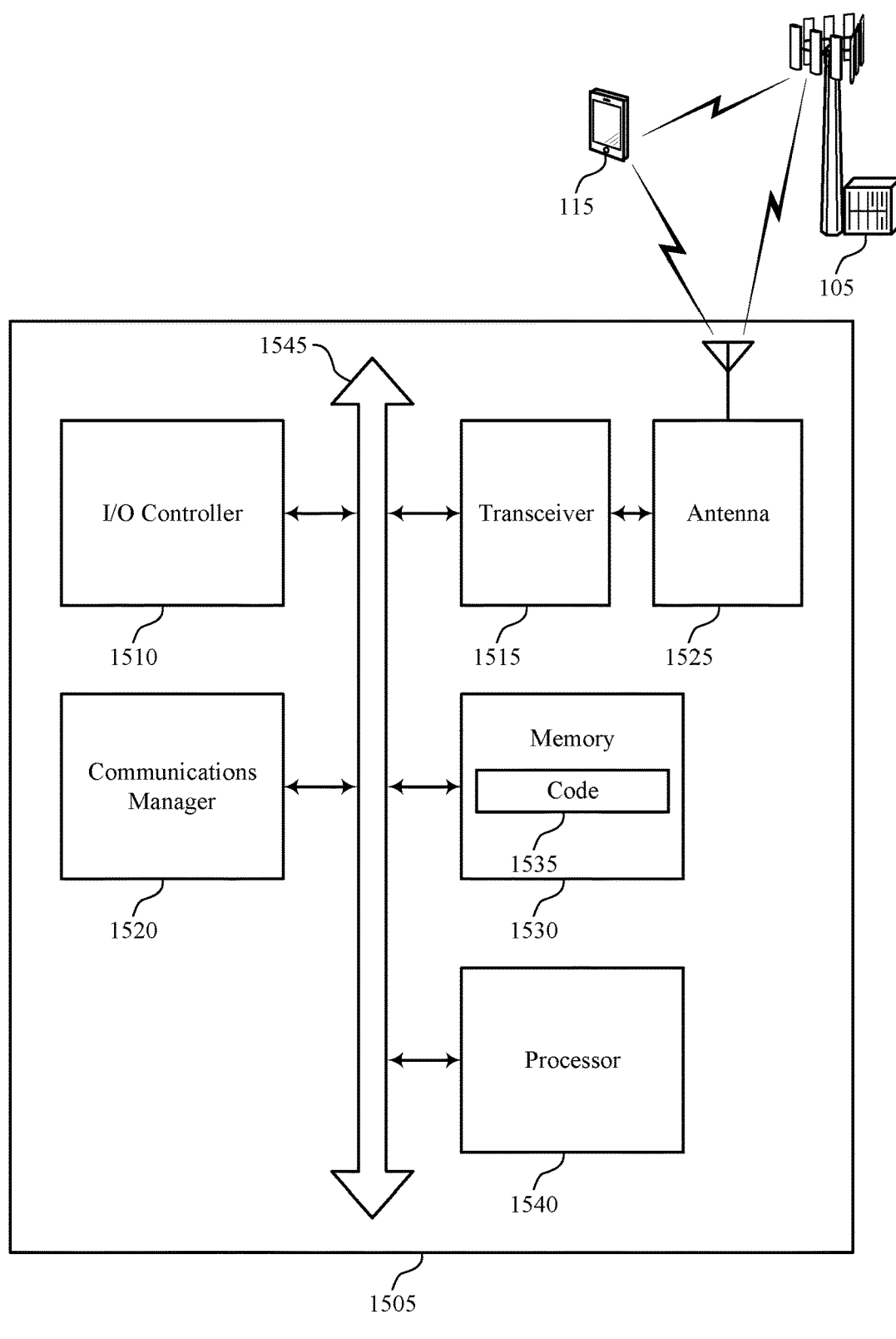
FIG. 15 shows a diagram of a system including a device that supports full-duplex operations for UEs in accordance with one or more aspects of the present disclosure.

FIG. 15 shows a diagram of a system 1500 including a device 1505 that supports full-duplex operations for UEs in accordance with one or more aspects of the present disclosure. The device 1505 may be an example of or include the components of a device 1205, a device 1305, or a UE 115 as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, at least one memory 1530, code 1535, and at least one processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WIN-DOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of one or more processors, such as the at least one processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The at least one memory 1530 may include random access memory (RAM) and read-only memory (ROM). The at least one memory 1530 may store computer-readable, computer-executable code 1535 including instructions that, when executed by the at least one processor 1540, cause the device 1505 to perform various functions described herein. The code 1535 may be stored in a non-transitory computer-readable medium such as system memory or another type of memory. In some cases, the code 1535 may not be directly executable by the at least one processor 1540 but may cause a computer (e.g., when compiled and executed) to perform functions described herein. In some cases, the at least one memory 1530 may contain, among other things, a basic I/O system (BIOS) which may control basic hardware or software operation such as the interaction with peripheral components or devices.

The at least one processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1540 may be configured to operate a memory array using a memory controller. In some other cases, a memory controller may be integrated into the at least one processor 1540. The at least one processor 1540 may be configured to execute computer-readable instructions stored in a memory (e.g., the at least one memory 1530) to cause the device 1505 to perform various functions (e.g., functions or tasks supporting full-duplex operations for UEs). For example, the device 1505 or a component of the device 1505 may include at least one processor 1540 and at least one memory 1530 coupled with or to the at least one processor 1540, the at least one processor 1540 and at least one memory 1530 configured to perform various functions described herein. In some examples, the at least one processor 1540 may include multiple processors and the at least one memory 1530 may include multiple memories. One or more of the multiple processors may be coupled with one or more of the multiple memories, which may, individually or collectively, be configured to perform various functions herein.

The communications manager 1520 may support wireless communications at a UE in accordance with examples as disclosed herein. For example, the communications manager 1520 is capable of, configured to, or operable to support a means for transmitting, to a network entity, a message indicating a first quantity and a second quantity of radio chains of the UE that are available for (e.g., that are physically included in the UE and which are configured for use for) communications in accordance with a half-duplex communication mode and a full-duplex communication mode, respectively. In such cases, the message indicates the first quantity of the radio chains that support the half-duplex communication mode and the second quantity of the radio chains that support the full-duplex communication mode. The communications manager 1520 is capable of, configured to, or operable to support a means for communicating with the network entity using the half-duplex communication mode in accordance with the first quantity of radio chains. The communications manager 1520 is capable of, configured to, or operable to support a means for communicating with the network entity using the full-duplex communication mode in accordance with the second quantity of radio chains.

Additionally, or alternatively, the communications manager 1520 may support wireless communications at a UE in accordance with examples as disclosed herein. For example, the communications manager 1520 is capable of, configured to, or operable to support a means for identifying a configuration of one or more fixed CCs or one or more fixed subbands within a CC that are reserved for uplink transmissions by the UE, where the uplink transmissions are associated with the UE operating using a full-duplex communication mode. The communications manager 1520 is capable of, configured to, or operable to support a means for transmitting, via the one or more fixed CCs or the one or more fixed subbands within the CC and while simultaneously receiving at least a portion of one or more downlink messages, one or more uplink messages based on operating using the full-duplex communication mode and in accordance with the configuration.

Additionally, or alternatively, the communications manager 1520 may support wireless communications at a UE in accordance with examples as disclosed herein. For example, the communications manager 1520 is capable of, configured to, or operable to support a means for identifying a configuration for a guard interval associated with switching between half-duplex communication resources and full-duplex communication resources, where the guard interval is based on a capability of the UE to operate using a full-duplex communication mode. The communications manager 1520 is capable of, configured to, or operable to support a means for communicating with a network entity via the half-duplex communication resources and the full-duplex communication resources in accordance with the guard interval between the half-duplex communication resources and the full-duplex communication resources.

By including or configuring the communications manager 1520 in accordance with examples as described herein, the device 1505 may support techniques for a UE to report radio chain quantities and identify resource and guard interval configurations for full-duplex communications at the UE, which may allow for improved communication reliability, reduced latency, more efficient utilization of communication resources, and improved coordination between devices.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the at least one processor 1540, the at least one memory 1530, the code 1535, or any combination thereof. For example, the code 1535 may include instructions executable by the at least one processor 1540 to cause the device 1505 to perform various aspects of full-duplex operations for UEs as described herein, or the at least one processor 1540 and the at least one memory 1530 may be otherwise configured to, individually or collectively, perform or support such operations.

FIG. 16 shows a flowchart illustrating a method 1600 that supports full-duplex operations for UEs in accordance with aspects of the present disclosure. The operations of the method 1600 may be implemented by a UE or its components as described herein. For example, the operations of the method 1600 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 1605, the method may include transmitting, to a network entity, a message indicating a first quantity and a second quantity of radio chains of the UE that are available for communications in accordance with a half-duplex communication mode and a full-duplex communication mode, respectively. In some aspects, the network entity may not be aware of the radio chains that are included at the UE and, as a result of the message indicating the first quantity of radio chains and the second quantity of radio chains, the network entity may be provided with information regarding the hardware of the UE, which may aid in scheduling full-duplex communications (e.g., where the UE simultaneously transmits and receives signaling) and/or half-duplex communications. The operations of 1605 may be performed in accordance with examples as disclosed herein. In some examples, aspects of the operations of 1605 may be performed by a radio chain indication message manager 1425 as described with reference to FIG. 14.

At 1610, the method may include communicating with the network entity using the full-duplex communication mode in accordance with the second quantity of radio chains. The operations of 1610 may be performed in accordance with examples as disclosed herein. In some examples, aspects of the operations of 1610 may be performed by a full-duplex communication manager 1435 as described with reference to FIG. 14.

FIG. 17 shows a flowchart illustrating a method 1700 that supports full-duplex operations for UEs in accordance with aspects of the present disclosure. The operations of the method 1700 may be implemented by a UE or its components as described herein. For example, the operations of the method 1700 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 1705, the method may include transmitting, to a network entity, a message indicating a first quantity and a second quantity of radio chains of the UE that are available for communications in accordance with a half-duplex communication mode and a full-duplex communication mode, respectively. The availability of the respective radio chains may be based on the physical hardware with which the UE is configured (e.g., different UE may have different designs corresponding to respective hardware configurations, including different quantities of RF chains). As an example, the message may indicate a first set of transmit chains associated with the half-duplex communication mode and a first set of receive chains associated with the half-duplex communication mode, the first quantity of radio chains including a quantity of the first set of transmit chains and a quantity of the first set of receive chains. In some aspects, the message may indicate a second set of transmit chains associated with the full-duplex communication mode and a second set of receive chains associated with the full-duplex communication mode, the second set of transmit chains including a subset of the first set of transmit chains, and the second set of receive chains including a subset of the first set of receive chains, where the second quantity of radio chains includes a quantity of the second set of transmit chains and a quantity of the second set of receive chains. The operations of 1705 may be performed in accordance with examples as disclosed herein. In some examples, aspects of the operations of 1705 may be performed by a radio chain indication message manager 1425 as described with reference to FIG. 14.

At 1710, the method may include communicating with the network entity using the full-duplex communication mode in accordance with the second quantity of radio chains. The operations of 1710 may be performed in accordance with examples as disclosed herein. In some examples, aspects of the operations of 1710 may be performed by a full-duplex communication manager 1435 as described with reference to FIG. 14.

FIG. 18 shows a flowchart illustrating a method 1800 that supports full-duplex operations for UEs in accordance with aspects of the present disclosure. The operations of the method 1800 may be implemented by a UE or its components as described herein. For example, the operations of the method 1800 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 1805, the method may include identifying a configuration of one or more fixed CCs or one or more fixed subbands within a CC that are reserved for uplink transmissions by the UE, where the uplink transmissions are associated with the UE operating using a full-duplex communication mode. The operations of 1805 may be performed in accordance with examples as disclosed herein. In some examples, aspects of the operations of 1805 may be performed by an uplink subband/CC configuration manager 1440 as described with reference to FIG. 14.

At 1810, the method may include transmitting, via the one or more fixed CCs or the one or more fixed subbands within the CC and while simultaneously receiving at least a portion of one or more downlink messages, one or more uplink messages based on operating using the full-duplex communication mode and in accordance with the configuration. The operations of 1810 may be performed in accordance with examples as disclosed herein. In some examples, aspects of the operations of 1810 may be performed by an uplink transmission manager 1445 as described with reference to FIG. 14.

FIG. 19 shows a flowchart illustrating a method 1900 that supports full-duplex operations for UEs in accordance with aspects of the present disclosure. The operations of the method 1900 may be implemented by a UE or its components as described herein. For example, the operations of the method 1900 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 1905, the method may include identifying a configuration of one or more fixed CCs or one or more fixed subbands within a CC that are reserved for uplink transmissions by the UE, where the uplink transmissions are associated with the UE operating using a full-duplex communication mode. The operations of 1905 may be performed in accordance with examples as disclosed herein. In some examples, aspects of the operations of 1905 may be performed by an uplink subband/CC configuration manager 1440 as described with reference to FIG. 14.

At 1910, the method may include identifying a guard band configuration that indicates a size of a first guard band between each of the one or more fixed CCs and one or more other CCs or a size of a second guard band between each of the one or more fixed subbands and one or more other subbands within the CC, where the one or more other CCs, or the one or more other subbands, or both, are associated with receiving at least a portion of one or more downlink messages during a same time interval as transmitting one or more uplink messages. The operations of 1910 may be performed in accordance with examples as disclosed herein. In some examples, aspects of the operations of 1910 may be performed by a guard band configuration manager 1460 as described with reference to FIG. 14.

At 1915, the method may include transmitting, via the one or more fixed CCs or the one or more fixed subbands within the CC and while simultaneously receiving the at least the portion of one or more downlink messages, the one or more uplink messages based on operating using the full-duplex communication mode and in accordance with the configuration. The operations of 1915 may be performed in accordance with examples as disclosed herein. In some examples, aspects of the operations of 1915 may be performed by an uplink transmission manager 1445 as described with reference to FIG. 14.

FIG. 20 shows a flowchart illustrating a method 2000 that supports full-duplex operations for UEs in accordance with aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2005, the method may include identifying a configuration for a guard interval associated with switching between half-duplex communication resources and full-duplex communication resources, where the guard interval is based on the UE operating using a full-duplex communication mode. The operations of 2005 may be performed in accordance with examples as disclosed herein. In some examples, aspects of the operations of 2005 may be performed by a guard interval configuration manager 1450 as described with reference to FIG. 14.

At 2010, the method may include communicating with a network entity via the half-duplex communication resources and the full-duplex communication resources in accordance with the guard interval between the half-duplex communication resources and the full-duplex communication resources. The operations of 2010 may be performed in accordance with examples as disclosed herein. In some examples, aspects of the operations of 2010 may be performed by a half-duplex and full-duplex communication manager 1455 as described with reference to FIG. 14.

The following provides an overview of aspects of the present disclosure:

Aspect 1: A method for wireless communications at a UE, comprising: transmitting, to a network entity, a message indicating a first quantity and a second quantity of radio chains of the UE that are available for communications in accordance with a half-duplex communication mode and a full-duplex communication mode, respectively; and communicating with the network entity using the full-duplex communication mode in accordance with the second quantity of radio chains.

Aspect 2: The method of aspect 1, wherein transmitting the message indicating the first quantity and the second quantity of radio chains of the UE comprises: transmitting the message indicating a first set of transmit chains and a first set of receive chains each associated with the half-duplex communication mode, the first quantity of radio chains comprising a quantity of the first set of transmit chains and a quantity of the first set of receive chains.

Aspect 3: The method of aspect 2, wherein transmitting the message indicating the first quantity and the second quantity of radio chains of the UE comprises: transmitting the message indicating a second set of transmit chains and a second set of receive chains each associated with the full-duplex communication mode, the second set of transmit chains comprising a subset of the first set of transmit chains, and the second set of receive chains comprising a subset of the first set of receive chains, wherein the second quantity of radio chains comprises a quantity of the second set of transmit chains and a quantity of the second set of receive chains.

Aspect 4: The method of aspect 3, wherein communicating with the network entity using the full-duplex communication mode comprises: transmitting signaling to the network entity using the second set of transmit chains via a first set of resources; and receiving signaling from the network entity using the second set of receive chains via a second set of resources that at least partially overlap in time with the first set of resources.

Aspect 5: The method of any of aspects 1 through 4, wherein the second quantity of radio chains is based at least in part on one or more capabilities of the UE.

Aspect 6: The method of aspect 5, wherein the one or more capabilities of the UE are based at least in part on a quantity of radio chains used for time-division duplexing resources, a power class of the UE, a distance between antenna elements of the UE, an antenna configuration of the UE, one or more antenna components of the UE, or any combination thereof.

Aspect 7: A method for wireless communications at a UE, comprising: identifying a configuration of one or more fixed CCs or one or more fixed subbands within a CC that are reserved for uplink transmissions by the UE, wherein the uplink transmissions are associated with the UE operating using a full-duplex communication mode; and transmitting, via the one or more fixed CCs or the one or more fixed subbands within the CC and while simultaneously receiving at least a portion of one or more downlink messages, one or more uplink messages based at least in part on operating using the full-duplex communication mode and in accordance with the configuration.

Aspect 8: The method of aspect 7, further comprising: identifying a guard band configuration that indicates a size of a first guard band between each of the one or more fixed CCs and one or more other CCs or a size of a second guard band between each of the one or more fixed subbands and one or more other subbands within the CC, wherein the one or more other CCs, or the one or more other subbands, or both, are associated with receiving the one or more downlink messages during a same time interval as transmitting the one or more uplink messages.

Aspect 9: The method of aspect 8, wherein the guard band configuration is identified based at least in part on one or more preconfigured guard band configurations.

Aspect 10: The method of any of aspects 8 through 9, further comprising: transmitting, to a network entity, a capability message comprising an indication of the guard band configuration, wherein the size of the first guard band or the size of the second guard band, or both, is based at least in part on one or more capabilities of the UE.

Aspect 11: The method of any of aspects 8 through 10, further comprising: refraining from transmitting uplink messages via the one or more other CCs based at least in part on the one or more fixed CCs and the size of the first guard band; and refraining from receiving downlink messages via the one or more fixed CCs based at least in part on the one or more fixed CCs and the size of the first guard band.

Aspect 12: The method of any of aspects 8 through 11, further comprising: refraining from transmitting uplink messages via the one or more other subbands within the CC based at least in part on the one or more fixed subbands and the size of the second guard band; and refraining from receiving downlink messages via the one or more fixed subbands based at least in part on the one or more fixed subbands and the size of the second guard band.

Aspect 13: The method of any of aspects 7 through 12, further comprising: selecting a first fixed CC from the one or more fixed CCs based at least in part on one or more capabilities of the UE, wherein transmitting the one or more uplink messages comprises transmitting the one or more uplink messages via the first fixed CC.

Aspect 14: The method of any of aspects 7 through 13, further comprising: selecting a first fixed subband from the one or more fixed subbands based at least in part on one or more capabilities of the UE, wherein transmitting the one or more uplink messages comprises transmitting the one or more uplink messages via the first fixed subband.

Aspect 15: The method of any of aspects 7 through 14, wherein the one or more fixed CCs are each defined by a preconfigured central frequency and a preconfigured bandwidth.

Aspect 16: The method of any of aspects 7 through 15, wherein the one or more fixed subbands within the CC are each defined by a preconfigured central frequency and a preconfigured bandwidth.

Aspect 17: The method of any of aspects 7 through 16, wherein the one or more fixed subbands within the CC are each defined by a first RB and a preconfigured quantity of RBs.

Aspect 18: A method for wireless communications at a UE, comprising: identifying a configuration for a guard interval associated with switching between half-duplex communication resources and full-duplex communication resources, wherein the guard interval is based at least in part on the UE operating using a full-duplex communication mode; and communicating with a network entity via the half-duplex communication resources and the full-duplex communication resources in accordance with the guard interval between the half-duplex communication resources and the full-duplex communication resources.

Aspect 19: The method of aspect 18, wherein the guard interval comprises a quantity of symbols associated with switching between the half-duplex communication resources and the full-duplex communication resources.

Aspect 20: The method of aspect 19, wherein the configuration of the guard interval is identified based at least in part on one or more preconfigured guard intervals.

Aspect 21: The method of any of aspects 19 through 20, wherein the quantity of symbols associated with switching between the half-duplex communication resources and the full-duplex communication resources is based at least in part on one or more capabilities of the UE.

Aspect 22: The method of aspect 18, wherein the guard interval comprises a transient time period associated with switching between the half-duplex communication resources and the full-duplex communication resources, the transient time period is defined with regard to an absolute time.

Aspect 23: A UE for wireless communications, comprising one or more memories storing processor-executable code, and one or more processors coupled with the one or more memories and individually or collectively operable to execute the code to cause the UE to perform a method of any of aspects 1 through 6.

Aspect 24: A UE for wireless communications, comprising at least one means for performing a method of any of aspects 1 through 6.

Aspect 25: A non-transitory computer-readable medium storing code for wireless communications, the code comprising instructions executable by one or more processors to perform a method of any of aspects 1 through 6.

Aspect 26: A UE for wireless communications, comprising one or more memories storing processor-executable code, and one or more processors coupled with the one or more memories and individually or collectively operable to execute the code to cause the UE to perform a method of any of aspects 7 through 17.

Aspect 27: A UE for wireless communications, comprising at least one means for performing a method of any of aspects 7 through 17.

Aspect 28: A non-transitory computer-readable medium storing code for wireless communications, the code comprising instructions executable by one or more processors to perform a method of any of aspects 7 through 17.

Aspect 29: A UE for wireless communications, comprising one or more memories storing processor-executable code, and one or more processors coupled with the one or more memories and individually or collectively operable to execute the code to cause the UE to perform a method of any of aspects 18 through 22.

Aspect 30: A UE for wireless communications, comprising at least one means for performing a method of any of aspects 18 through 22.

Aspect 31: A non-transitory computer-readable medium storing code for wireless communications, the code comprising instructions executable by one or more processors to perform a method of any of aspects 18 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communications, comprising:
   one or more memories storing processor-executable code; and
   one or more processors coupled with the one or more memories and individually or collectively operable to cause the UE to:
      transmit, to a network entity, a capability message comprising an indication of a guard band configuration that is based at least in part on one or more capabilities of the UE;
      identify a configuration of one or more fixed component carriers that are reserved for uplink transmissions by the UE, wherein the uplink transmissions are associated with the UE operating using a full-duplex communication mode; and
      transmit, via the one or more fixed component carriers and while simultaneously receiving at least a portion of one or more downlink messages via one or more other component carriers, one or more uplink messages based at least in part on operating using the full-duplex communication mode and in accordance with the configuration, wherein a guard band between the one or more fixed component carriers and the one or more other component carriers is based at least in part on the guard band configuration.

2. The UE of claim 1, wherein the one or more processors are individually or collectively operable to execute the code to cause the UE to:
   identify the guard band configuration that indicates a size of a first guard band between each of the one or more fixed component carriers and the one or more other component carriers.

3. The UE of claim 2, wherein the guard band configuration is based at least in part on one or more preconfigured guard band configurations.

4. The UE of claim 2, wherein the one or more processors are individually or collectively operable to execute the code to cause the UE to:
   refrain from transmitting uplink messages via the one or more other component carriers based at least in part on the one or more fixed component carriers and the size of the first guard band; and
   refrain from receiving downlink messages via the one or more fixed component carriers based at least in part on the one or more fixed component carriers and the size of the first guard band.

5. The UE of claim 1, wherein the one or more processors are individually or collectively operable to execute the code to cause the UE to:
   select a first fixed component carrier from the one or more fixed component carriers based at least in part on one or more additional capabilities of the UE, wherein transmitting the one or more uplink messages comprises transmitting the one or more uplink messages via the first fixed component carrier.

6. The UE of claim 1, wherein the one or more fixed component carriers are each defined by a preconfigured central frequency and a preconfigured bandwidth.

7. A method for wireless communications at a user equipment (UE), comprising:
   transmitting, to a network entity, a capability message comprising an indication of a guard band configuration that is based at least in part on one or more capabilities of the UE;
   identifying a configuration of one or more fixed component carriers that are reserved for uplink transmissions by the UE, wherein the uplink transmissions are associated with the UE operating using a full-duplex communication mode; and
   transmitting, via the one or more fixed component carriers and while simultaneously receiving at least a portion of one or more downlink messages via one or more other component carriers, one or more uplink messages based at least in part on operating using the full-duplex communication mode and in accordance with the configuration, wherein a guard band between the one or more fixed component carriers and the one or more other component carriers is based at least in part on the guard band configuration.

8. The method of claim 7, further comprising:

identifying the guard band configuration that indicates a size of a first guard band between each of the one or more fixed component carriers and the one or more other component carriers.

9. The method of claim 8, wherein the guard band configuration is identified based at least in part on one or more preconfigured guard band configurations.

10. The method of claim 8, further comprising:

refraining from transmitting uplink messages via the one or more other component carriers based at least in part on the one or more fixed component carriers and the size of the first guard band; and refraining from receiving downlink messages via the one or more fixed component carriers based at least in part on the one or more fixed component carriers and the size of the first guard band.

11. The method of claim 7, wherein the one or more fixed component carriers are each defined by a preconfigured central frequency and a preconfigured bandwidth.

12. The method of claim 7, further comprising:

selecting a first fixed component carrier from the one or more fixed component carriers based at least in part on one or more additional capabilities of the UE, wherein transmitting the one or more uplink messages comprises transmitting the one or more uplink messages via the first fixed component carrier.

13. A non-transitory computer-readable medium storing code for wireless communications, the code comprising instructions executable by one or more processors to:

transmit, to a network entity, a capability message comprising an indication of a guard band configuration that is based at least in part on one or more capabilities of a user equipment (UE);

identify a configuration of one or more fixed component carriers that are reserved for uplink transmissions by the UE, wherein the uplink transmissions are associated with the UE operating using a full-duplex communication mode; and transmit, via the one or more fixed component carriers and while simultaneously receiving at least a portion of one or more downlink messages via one or more other component carriers, one or more uplink messages based at least in part on operating using the full-duplex communication mode and in accordance with the configuration, wherein a guard band between the one or more fixed component carriers and the one or more other component carriers is based at least in part on the guard band configuration.

14. The non-transitory computer-readable medium of claim 13, wherein the instructions are further executable by the one or more processors to:

identify the guard band configuration that indicates a size of a first guard band between each of the one or more fixed component carriers and the one or more other component carriers.

15. The non-transitory computer-readable medium of claim 14, wherein the guard band configuration is based at least in part on one or more preconfigured guard band configurations.

16. The non-transitory computer-readable medium of claim 14, wherein the instructions are further executable by the one or more processors to:

refrain from transmitting uplink messages via the one or more other component carriers based at least in part on the one or more fixed component carriers and the size of the first guard band; and refrain from receiving downlink messages via the one or more fixed component carriers based at least in part on the one or more fixed component carriers and the size of the first guard band.

17. The non-transitory computer-readable medium of claim 13, wherein the instructions are further executable by the one or more processors to:

select a first fixed component carrier from the one or more fixed component carriers based at least in part on one or more additional capabilities of the UE, wherein transmitting the one or more uplink messages comprises transmitting the one or more uplink messages via the first fixed component carrier.

18. A user equipment (UE) for wireless communication, comprising:

means for transmitting, to a network entity, a capability message comprising an indication of a guard band configuration that is based at least in part on one or more capabilities of the UE;

means for identifying a configuration of one or more fixed component carriers that are reserved for uplink transmissions by the UE, wherein the uplink transmissions are associated with the UE operating using a full-duplex communication mode; and means for transmitting, via the one or more fixed component carriers and while simultaneously receiving at least a portion of one or more downlink messages via one or more other component carriers, one or more uplink messages based at least in part on operating using the full-duplex communication mode and in accordance with the configuration, wherein a guard band between the one or more fixed component carriers and the one or more other component carriers is based at least in part on the guard band configuration.

* * * * *